(12) United States Patent
Han

(10) Patent No.: US 11,227,493 B2
(45) Date of Patent: Jan. 18, 2022

(54) ROAD SPEED LIMIT IDENTIFICATION METHOD, ROAD SPEED LIMIT IDENTIFICATION APPARATUS, ELECTRONIC APPARATUS, COMPUTER PROGRAM, AND COMPUTER READABLE RECORDING MEDIUM

(71) Applicant: THINKWARE CORPORATION, Seongnam-si (KR)

(72) Inventor: Ga Young Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 16/701,471

(22) Filed: Dec. 3, 2019

(65) Prior Publication Data
US 2020/0184812 A1 Jun. 11, 2020

(30) Foreign Application Priority Data
Dec. 6, 2018 (KR) .......................... 10-2018-0156230

(51) Int. Cl.
*G08G 1/0962* (2006.01)
*G06K 9/00* (2006.01)
*G06K 9/20* (2006.01)
*B60R 1/00* (2006.01)
*G06K 9/62* (2006.01)

(52) U.S. Cl.
CPC ........... *G08G 1/09626* (2013.01); *B60R 1/00* (2013.01); *G06K 9/00671* (2013.01); *G06K 9/00818* (2013.01); *G06K 9/2054* (2013.01); *G06K 9/6269* (2013.01); *B60R 2300/205* (2013.01); *B60R 2300/301* (2013.01); *B60R 2300/80* (2013.01)

(58) Field of Classification Search
CPC ................................... G06K 9/00818
USPC ........................................... 345/633
See application file for complete search history.

(56) References Cited

U.S. PATENT DOCUMENTS 6,266,442 B1 * 7/2001 Laumeyer .......... G06K 9/00818
382/104
9,129,163 B2 * 9/2015 Chen .................... G06F 16/583
(Continued)

OTHER PUBLICATIONS

"Real-time Korean Traffic Sign Detection and Recognition" Jihie Kim et al., Jan. 17-19, 2013, ACM 978-1-4503-1958-4.*
(Continued)

*Primary Examiner* — Javid A Amini
(74) *Attorney, Agent, or Firm* — Westerman, Hattori, Daniels & Adrian, LLP

(57) ABSTRACT

Disclosed is a road speed limit identification method. The road speed limit identification method includes: obtaining a driving image captured during driving of a moving object; setting a region of interest in the obtained driving image and generating a grayscale-processed image on the basis of an image of the region of interest; detecting a speed limit sign image from the grayscale-processed image; calculating a first brightness value of a number region, a second brightness value of a border region, and a third brightness value of an in-border region other than the number region in the detected speed limit sign image; and identifying a speed limit displayed on a speed limit sign on the basis of the plurality of calculated brightness values.

16 Claims, 20 Drawing Sheets

(56) References Cited

U.S. PATENT DOCUMENTS

| | | | | |
|---|---|---|---|---|
| 10,086,756 | B2* | 10/2018 | Manci | B60Q 9/00 |
| 2003/0214585 | A1* | 11/2003 | Bakewell | G08G 1/054 |
| | | | | 348/148 |
| 2009/0074249 | A1* | 3/2009 | Moed | G06K 9/00818 |
| | | | | 382/104 |
| 2010/0316255 | A1* | 12/2010 | Mathony | G08G 1/09675 |
| | | | | 382/103 |
| 2012/0026352 | A1* | 2/2012 | Natroshvili | G06T 7/13 |
| | | | | 348/222.1 |
| 2012/0081544 | A1* | 4/2012 | Wee | G01S 17/931 |
| | | | | 348/140 |
| 2013/0088600 | A1* | 4/2013 | Wu | G08G 1/054 |
| | | | | 348/149 |
| 2013/0201334 | A1* | 8/2013 | C | G06K 9/00536 |
| | | | | 348/148 |
| 2014/0193071 | A1* | 7/2014 | Cho | G06K 9/00771 |
| | | | | 382/170 |
| 2016/0110882 | A1* | 4/2016 | Paik | G06T 7/215 |
| | | | | 382/103 |
| 2016/0283805 | A1* | 9/2016 | Abhau | G06K 9/00818 |
| 2016/0311362 | A1* | 10/2016 | Fendt | B60Q 1/085 |
| 2016/0321510 | A1* | 11/2016 | Abhau | G06K 9/00818 |
| 2017/0092125 | A1* | 3/2017 | Fujimaki | G08G 1/09623 |
| 2017/0206887 | A1* | 7/2017 | Wilbert | G06K 9/3258 |
| 2017/0243485 | A1* | 8/2017 | Rubin | H04W 4/026 |
| 2018/0025636 | A1* | 1/2018 | Boykin | G06K 9/00335 |
| | | | | 701/1 |
| 2018/0068559 | A1* | 3/2018 | Bjersing | G06K 9/00818 |
| 2018/0118208 | A1* | 5/2018 | Inoguchi | B60W 50/085 |
| 2018/0225530 | A1* | 8/2018 | Kunze | G06K 9/00798 |
| 2018/0246907 | A1* | 8/2018 | Thiel | G06F 16/29 |
| 2018/0260639 | A1* | 9/2018 | Kapach | G08G 1/09623 |
| 2018/0336692 | A1* | 11/2018 | Wendel | G06K 9/00825 |
| 2019/0036946 | A1* | 1/2019 | Ruvio | H04W 4/44 |
| 2019/0289260 | A1* | 9/2019 | Park | H04N 5/23206 |
| 2019/0324452 | A1* | 10/2019 | Sato | G05D 1/0061 |
| 2019/0325595 | A1* | 10/2019 | Stein | B60W 40/06 |
| 2020/0034641 | A1* | 1/2020 | Sergeev | G06K 9/00818 |
| 2020/0042849 | A1* | 2/2020 | Howard | G06K 19/06037 |
| 2020/0109954 | A1* | 4/2020 | Li | G05D 1/0274 |
| 2020/0126240 | A1* | 4/2020 | Tsai | G06T 7/248 |
| 2020/0150275 | A1* | 5/2020 | Zhu | G06T 17/05 |
| 2020/0309533 | A1* | 10/2020 | Young | G01C 21/28 |
| 2020/0349833 | A1* | 11/2020 | Lerner | G08G 1/0112 |

OTHER PUBLICATIONS

"Ensemble of SVM for Accurate Traffic Sign Detection and Recognition" Sneha Agrawal et al., Jun. 24-27, 2017, ACM ISBN 978-1-4503-5239-0/17/06.*

* cited by examiner $11001011_{(2)}$

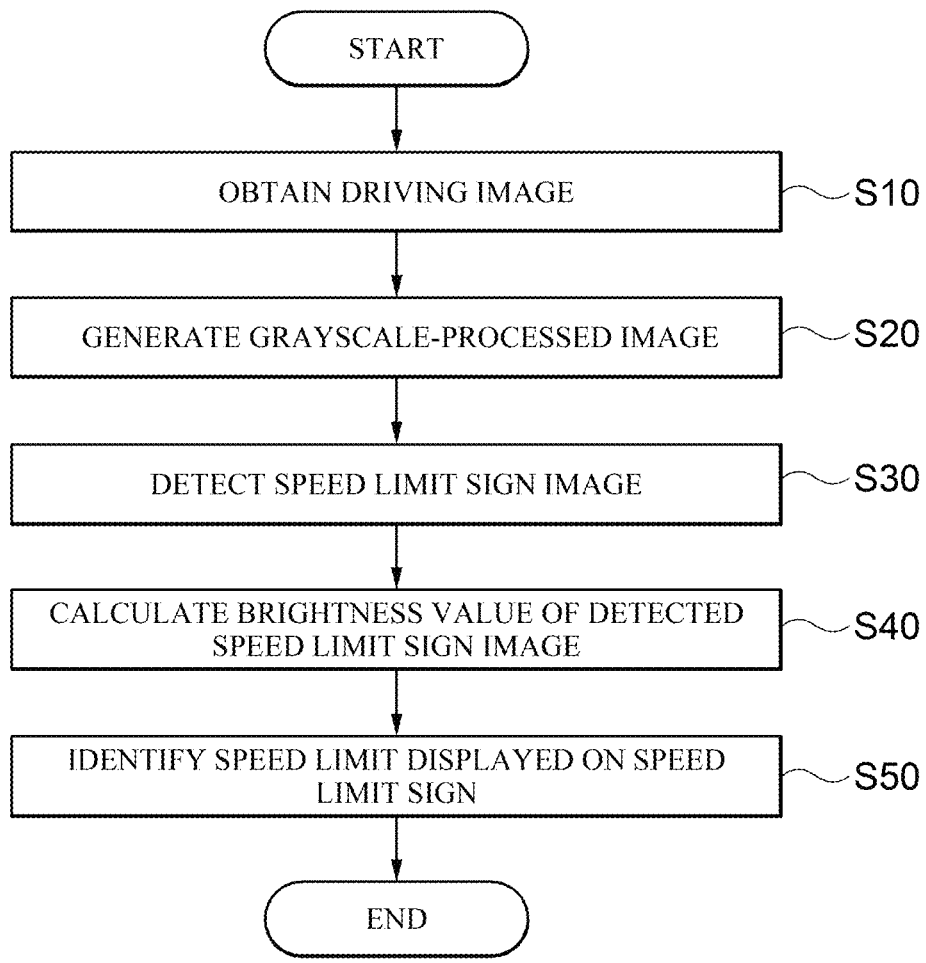

ROAD SPEED LIMIT IDENTIFICATION METHOD, ROAD SPEED LIMIT IDENTIFICATION APPARATUS, ELECTRONIC APPARATUS, COMPUTER PROGRAM, AND COMPUTER READABLE RECORDING MEDIUM

CROSS-REFERENCE TO RELATED APPLICATION(S)

This application claims benefit of priority to Korean Patent Application No. 10-2018-0156230 filed on Dec. 6, 2018 in the Korean Intellectual Property Office, the disclosure of which is incorporated herein by reference in its entirety.

BACKGROUND

1. Field

The present disclosure relates to a road speed limit identification method, a road speed limit identification apparatus, an electronic apparatus, a computer program, and a computer readable recording medium for identifying a road speed limit by using a driving image captured during driving of a vehicle.

2. Description of Related Art

As the Internet network is open and laws related to location data are set, a location based service (LBS) industry has been vitalized. Representative devices using such a location based service include a navigation device for a vehicle that identifies a current location of a vehicle or the like or guides a route to a destination.

The navigation device provides, to a driver, various types of information during driving of the vehicle by using vehicle location information obtained using a global positioning system (GPS) satellite, and traffic information stored in a pre-constructed database. As an example, the navigation device provides a service of providing notification of speed limits on a road on which the vehicle is being driven.

However, in the case of a road speed limit notification method according to the related art, in the case where the database is not updated after road speed limits are changed, the driver is provided with wrong road speed limits, and as a result, the driver is confused and convenience and safety of the driver deteriorate.

Further, the navigation device according to the related art may not provide an accurate road speed limit to a vehicle that is being driven on a road with a variable speed limit system, on which a road speed limit is changed to an appropriate speed limit moment by moment depending on an external environmental element such as a weather change such as fog, heavy rain, or bad weather.

SUMMARY

An object of the present disclosure is to provide a road speed limit identification method, a road speed limit identification apparatus, an electronic apparatus, a computer program, and a computer readable recording medium for identifying a road speed limit by analyzing a speed limit sign included in a driving image captured in real time during driving of a moving object, and for providing notification of the road speed limit.

Further, an object of the present disclosure is to provide a road speed limit identification method, a road speed limit identification apparatus, an electronic apparatus, a computer program, and a computer readable recording medium for providing notification of a road speed limit by analyzing a change of a variable speed limit sign in real time even in the case where a moving object is being driven on a road on which the variable speed limit sign is installed. Further, an object of the present disclosure is to provide a road speed limit identification method, a road speed limit identification apparatus, an electronic apparatus, a computer program, and a computer readable recording medium for recognizing both a normal safety sign and a luminous type safety sign.

According to an embodiment of the present disclosure, a road speed limit identification method using a processor includes: obtaining a driving image captured during driving of a moving object; setting a region of interest in the obtained driving image and generating a grayscale-processed image on the basis of an image of the region of interest; detecting a speed limit sign image from the grayscale-processed image; calculating a first brightness value of a number region, a second brightness value of a border region, and a third brightness value of an in-border region other than the number region in the detected speed limit sign image; and identifying a speed limit displayed on a speed limit sign on the basis of the plurality of calculated brightness values.

The generating of the grayscale-processed image may include generating a grayscale image by performing first grayscale processing on the image of the region of interest; and generating an inverted grayscale image by performing second grayscale processing on the image of the region of interest, and the first grayscale processing and the second grayscale processing may be performed alternately.

The road speed limit identification method may further include performing equalization by applying contrast limited adaptive histogram equalization (CLAHE) on the generated grayscale-processed image.

In the detecting of the speed limit sign image, the speed limit sign may be detected by using, for the equalized image, a cascade algorithm in which a plurality of classifying devices using multi-scale block local binary pattern (MB-LBP) features are connected in a cascade structure.

The speed limit sign may include a normal safety sign and a luminous safety sign.

The road speed limit identification method may further include: detecting an in-sign region image to be used to classify the speed limit sign, from the speed limit sign image by using the plurality of calculated brightness values; and classifying the detected in-sign region image according to a content of the speed limit sign.

The classifying may include: primarily classifying the detected in-sign region image according to the content of the speed limit sign on the basis of a feature of a first local binary pattern (LBP) by using a support vector machine (SVM) classifier; and secondarily classifying the detected in-sign region image on the basis of a feature of a modified second LBP.

The road speed limit identification method may further include generating map update data for updating a speed limit of map data in the case where a speed limit allocated to the map data at a location of the moving object and the speed limit identified from the driving image do not coincide with each other.

According to another embodiment of the present disclosure, a road speed limit identification apparatus includes: an image obtaining unit obtaining a driving image captured during driving of a moving object; a grayscale processing unit setting a region of interest in the obtained driving image and generating a grayscale-processed image on the basis of an image of the region of interest; a speed limit sign detection unit detecting a speed limit sign image from the grayscale-processed image; a brightness calculation unit calculating a first brightness value of a number region, a second brightness value of a border region, and a third brightness value of an in-border region other than the number region in the detected speed limit sign image; and a speed limit identification unit identifying a speed limit displayed on a speed limit sign on the basis of the plurality of calculated brightness values.

The grayscale processing unit may generate a grayscale image by performing first grayscale processing on the image of the region of interest and generate an inverted grayscale image by performing second grayscale processing on the image of the region of interest, and the first grayscale processing and the second grayscale processing may be performed alternately.

The road speed limit identification apparatus may further include an equalization unit performing equalization by applying CLAHE on the generated grayscale-processed image.

The speed limit sign detection unit may detect the speed limit sign by using, for the equalized image, a cascade algorithm in which a plurality of classifying devices using MB-LBP features are connected in a cascade structure.

The speed limit sign may include a normal safety sign and a luminous safety sign.

The speed limit identification unit may include an in-sign region detection unit detecting an in-sign region image to be used to classify the speed limit sign, from the speed limit sign image by using the plurality of calculated brightness values; and an in-sign region classification unit classifying the detected in-sign region image according to a content of the speed limit sign.

The in-sign region classification unit may primarily classify the detected in-sign region image according to the content of the speed limit sign on the basis of a feature of a first local binary pattern (LBP) by using a support vector machine (SVM) classifier, and secondarily classify the detected in-sign region image on the basis of a feature of a modified second LBP.

The road speed limit identification apparatus may further include a map update data generation unit generating map update data for updating a speed limit of map data in the case where a speed limit allocated to the map data at a location of the moving object and the speed limit identified from the driving image do not coincide with each other.

According to another embodiment of the present disclosure, an electronic apparatus providing notification for assisting in driving by a driver includes: an output unit outputting notification information that is checkable by the driver; an image obtaining unit obtaining a driving image captured during driving of a moving object; a grayscale processing unit setting a region of interest in the obtained driving image and generating a grayscale-processed image on the basis of an image of the region of interest; a speed limit sign detection unit detecting a speed limit sign image from the grayscale-processed image; a brightness calculation unit calculating a first brightness value of a number region, a second brightness value of a border region, and a third brightness value of an in-border region other than the number region in the detected speed limit sign image; a speed limit identification unit identifying a speed limit displayed on a speed limit sign on the basis of the plurality of calculated brightness values; and a control unit controlling the output unit to output speed limit notification for a road on which the moving object is being driven, on the basis of the identified speed limit.

The output unit may include a display unit outputting an augmented reality image by combining the captured driving image and a notification object, and once the speed limit on the road on which the moving object is being driven is identified from the driving image, the control unit may generate a speed limit notification object indicating a speed limit value corresponding to the identified speed limit, and control the display unit to display the generated speed limit notification object on the augmented reality image.

In the case where a driving speed of the moving object exceeds the speed limit, the control unit may perform a control to change at least one of a color, a size, or a displayed position of the notification object.

Once a change of the speed limit on the road on which the moving object is being driven is detected during driving of the moving object on a road section on which a variable speed limit system is installed, the control unit may control the output unit to notify that the speed limit is changed.

According to another embodiment of the present disclosure, a program for performing the road speed limit identification method stored in a computer readable recording medium may be provided.

According to another embodiment of the present disclosure, a computer readable recording medium storing the program for performing the road speed limit identification method may be provided.

BRIEF DESCRIPTION OF DRAWINGS

FIG. 9 is a flowchart illustrating a road speed limit identification method according to an embodiment of the present disclosure;

DETAILED DESCRIPTION

Figure 1:
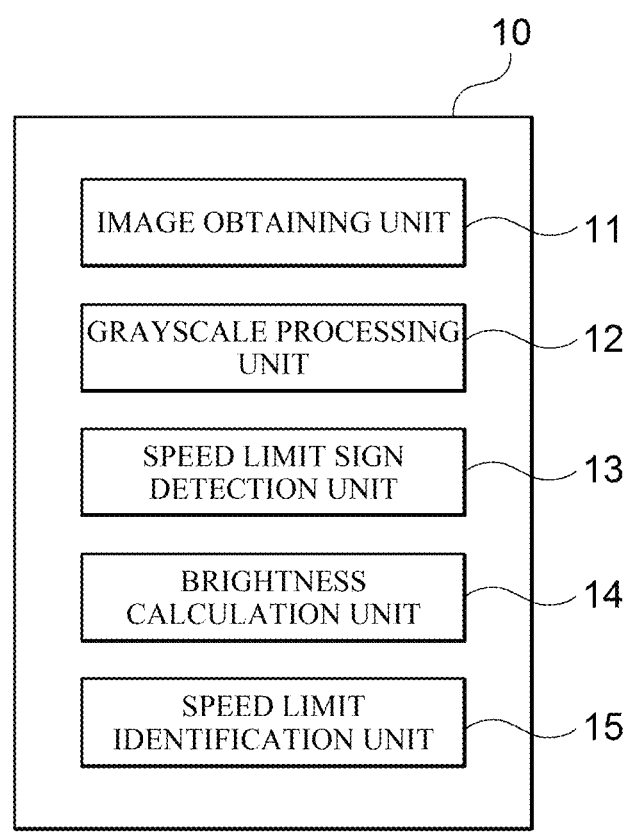
FIG. 1 is a block diagram illustrating a road speed limit identification apparatus according to an embodiment of the present disclosure.

The following description illustrates only a principle of the present disclosure. Therefore, those skilled in the art may implement the principle of the present disclosure and invent various apparatuses included in the spirit and scope of the present disclosure although not clearly described or illustrated in the present specification. In addition, it is to be understood that all conditional terms and embodiments mentioned in the present specification are obviously intended only to allow those skilled in the art to understand a concept of the present disclosure in principle, and the present disclosure is not limited to embodiments and states particularly mentioned as such.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented, so as to perform the same function regardless of a structure.

Therefore, it is to be understood that, for example, block diagrams of the present specification illustrate a conceptual aspect of an illustrative circuit for embodying a principle of the present disclosure. Similarly, it is to be understood that all flow charts, state transition diagrams, pseudo-codes, and the like illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having the capability to execute appropriate software as well as dedicated hardware. When the functions are provided by the processors, they may be provided by a single dedicated processor, a single shared processor, or a plurality of individual processors, and some of them may be shared with each other.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present disclosure pertains may easily practice a technical idea of the present disclosure. Further, in describing the present disclosure, in the case where it is decided that a detailed description of a well-known technology associated with the present disclosure may unnecessarily make the gist of the present disclosure unclear, it will be omitted.

Hereinafter, various embodiments of the present disclosure will be described in detail with reference to the accompanying drawings.

Figure 2:
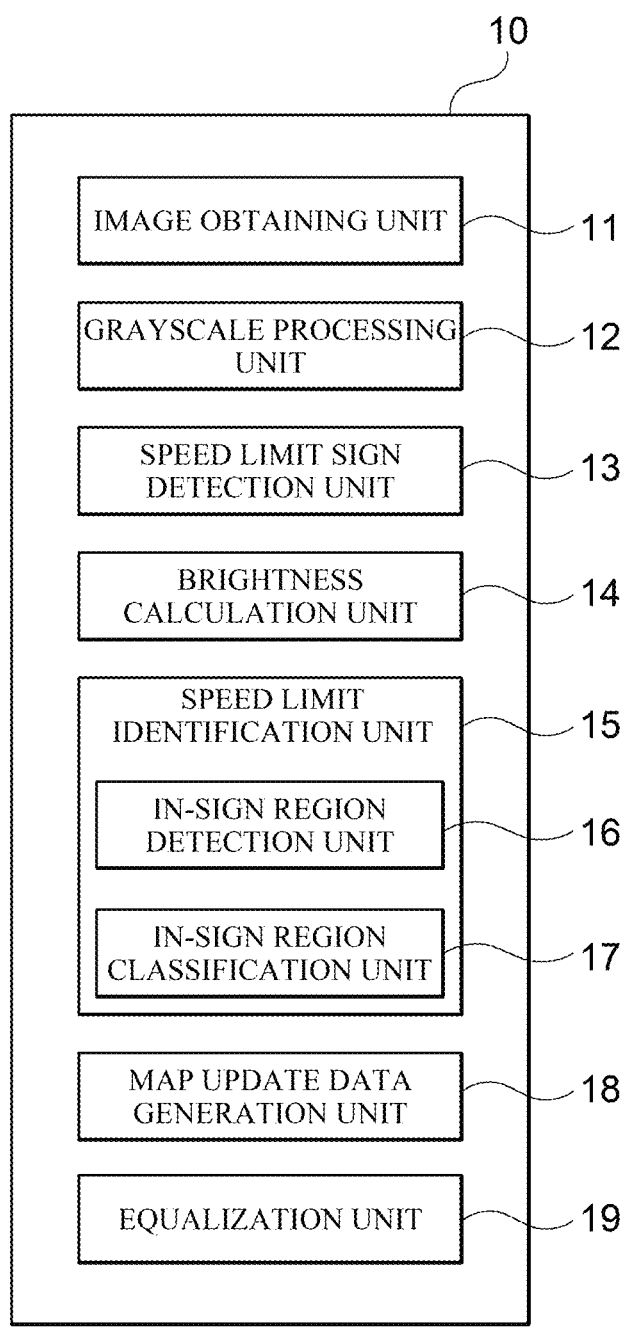
FIG. 2 is a block diagram more specifically illustrating the road speed limit identification apparatus according to an embodiment of the present disclosure.

FIG. 1 is a block diagram illustrating a road speed limit identification apparatus according to an embodiment of the present disclosure. FIG. 2 is a block diagram more specifically illustrating the road speed limit identification apparatus according to the embodiment of the present disclosure. Referring to FIGS. 1 and 2, a road speed limit identification apparatus 10 may include some or all of an image obtaining unit 11, a grayscale processing unit 12, a speed limit sign detection unit 13, a brightness calculation unit 14, a speed limit identification unit 15, a map update data generation unit 18, and an equalization unit 19. Here, the speed limit identification unit 15 may include some or all of an in-sign region detection unit 16 and an in-sign region classification unit 17.

The road speed limit identification apparatus 10 may detect a speed limit sign image from a driving image captured during driving of a moving object, and identify a speed limit on a road on which the moving object is being driven, on the basis of the detected speed limit sign image. Specifically, the road speed limit identification apparatus 10 may obtain a driving image captured during driving of a moving object, set a region of interest in the obtained driving image, generate a grayscale-processed image on the basis of an image of the region of interest, and detect a speed limit sign image from the grayscale-processed image. Further, the road speed limit identification apparatus 10 may calculate a first brightness value of a number region in the detected speed limit sign image, a second brightness value of a border region, and a third brightness value of an in-border region other than the number region, and identify a speed limit shown on the speed limit sign on the basis of the plurality of calculated brightness values.

Here, the road speed limit identification apparatus 10 may be implemented using software, hardware, or a combination thereof. As an example, according to a hardware implementation, the road speed limit identification apparatus 10 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electric units for performing other functions.

The moving object, which is a movable object of which a location needs to be identified, may be, for example, a person, a dog, a vehicle, a ship, a motorcycle, a bicycle, or a train. Hereinafter, the case where the moving object is implemented by a vehicle will be described by way of example for convenience of explanation, and each component module of the road speed limit identification apparatus 10 will be described in more detail.

The image obtaining unit 11 may obtain an image captured during driving of the vehicle. Specifically, the image obtaining unit 11 may obtain a driving image captured by a capturing device mounted on the vehicle in real time during driving of the vehicle. Here, the obtained driving image may include a plurality of lanes defined by lines, a road with multiple lanes, and a plurality of vehicles that are being driven on the road. Further, the obtained driving image may also include a speed limit sign depending on a road on which the vehicle is being driven.

Here, the line may mean each of two lines forming the lane in which the vehicle is located. In addition, the lane may be formed by the line such as a first lane, a second lane, . . . an N lane, and may mean a road on which the vehicle is driven. Further, the speed limit sign may mean a notification sign in which a speed limit on a road on which the vehicle is being driven is expressed as number or the like.

The grayscale processing unit 12 may set the region of interest in the driving image obtained by the image obtaining unit 11, and generate a grayscale-processed image on the basis of an image of the region of interest.

Here, the region of interest may mean a region including a target of interest in the obtained image. As an example, the target of interest according to an embodiment of the present disclosure may be the speed limit sign. The speed limit sign is installed on an installation pole and thus positioned at an upper side position away from a road surface by a predetermined distance. Therefore, it is likely that the speed limit sign is positioned at an upper side portion of the driving image captured by the capturing device. Accordingly, the grayscale processing unit 12 may set an upper region occupying 40% of the driving image as the region of interest.

However, the target of interest of the present disclosure is not limited to the speed limit sign, and may include various road signs installed on a road and providing information to the driver. For example, the target of interest may include a width limit sign, a weight limit sign, a height limit sign, a following distance limit sign, and a minimum speed limit sign. The road sign is installed on an installation pole and thus positioned at an upper side position away from a road surface by a predetermined distance. Therefore, it is likely that the road sign is positioned at an upper side portion of the driving image captured by the capturing device. Accordingly, the grayscale processing unit 12 may set an upper region occupying 40% of the driving image as the region of interest.

Meanwhile, according to another embodiment of the present disclosure, the road sign may be marked directly on a road surface. In this case, the grayscale processing unit 12 may set a region below a vanishing point, in which the road surface is positioned, in the driving image as the region of interest.

As such, only a portion of the obtained driving image is set as the region of interest, such that it is possible to remove a region unnecessary for obtaining information from the obtained driving image, and implement more efficient image processing to be performed later.

Further, the grayscale processing unit 12 may generate a grayscale-processed image on the basis of the image of the set region of interest. Here, the grayscale-processed image may include a grayscale image generated by first grayscale processing and an inverted grayscale image generated by second grayscale processing. That is, the grayscale-processed image may collectively refer to the grayscale image and the inverted grayscale image.

Specifically, the grayscale processing unit 12 may perform the first grayscale processing on the image of the set region of interest to generate the grayscale image. Here, the first grayscale processing may mean that an image is processed to have only a brightness value without color information. That is, the grayscale processing unit 12 may perform the first grayscale processing on the image of the set region of interest to generate the grayscale image having only a brightness value without color information. Further, the grayscale processing unit 12 may perform the second grayscale processing on the image of the set region of interest to generate the inverted grayscale image. Here, the second grayscale processing may mean that an image is processed to have only a brightness value without color information, and then the image is processed to have an inverted grayscale value. Here, inverted grayscale processing may mean that each grayscale value of the image is inverted. For example, in the case where a grayscale value of an 8-bit image is 20, the grayscale processing unit 12 may change the grayscale value to 235, which is a value obtained by subtracting 20 from 255, which is the maximum grayscale value, to generate the inverted grayscale image. That is, the grayscale processing unit 12 may perform the second grayscale processing on the image of the set region of interest to generate the inverted grayscale image having only a brightness value without color information.

Further, the grayscale processing unit 12 may perform the first grayscale processing and the second grayscale processing alternately. That is, the grayscale processing unit 12 may perform the first grayscale processing and the second grayscale processing alternately on the image of the region of interest to generate the grayscale image and the inverted grayscale image.

The road speed limit identification apparatus 10 may accurately detect both of a normal safety sign and a luminous safety sign by generating both of the grayscale image and the inverted grayscale image by performing the first grayscale processing and the second grayscale processing alternately. Here, the normal safety sign means a signpost that reflects headlights of the vehicle to provide recognizability, and the luminous safety sign means a signpost that induces light from an internal light emitting diode through an optical fiber to emit light to thereby improve recognizability. Hereinafter, the normal safety sign, the luminous safety sign, and grayscale-processed images thereof will be described in more detail with reference to FIGS. 3A to 4C.

Figure 3A:
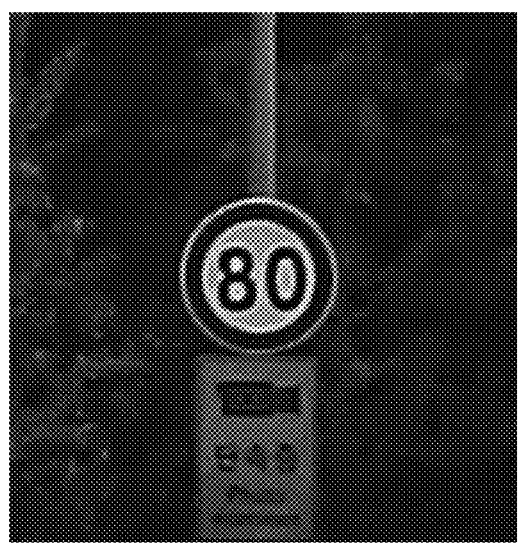
FIGS. 3A and 3B are views each illustrating an image of a region of interest according to an embodiment of the present disclosure.
Figure 3B:
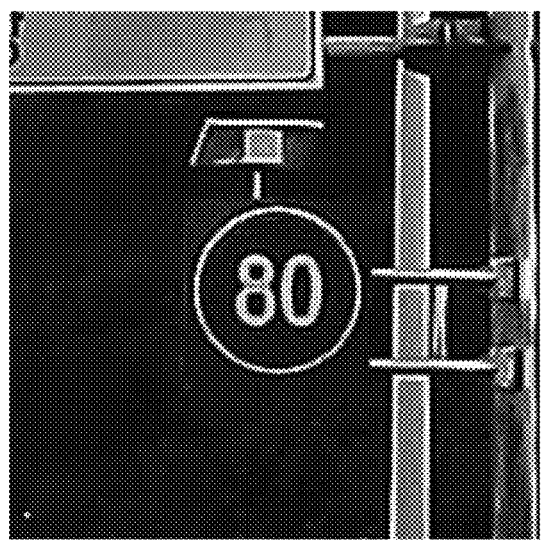
Figure 4A:
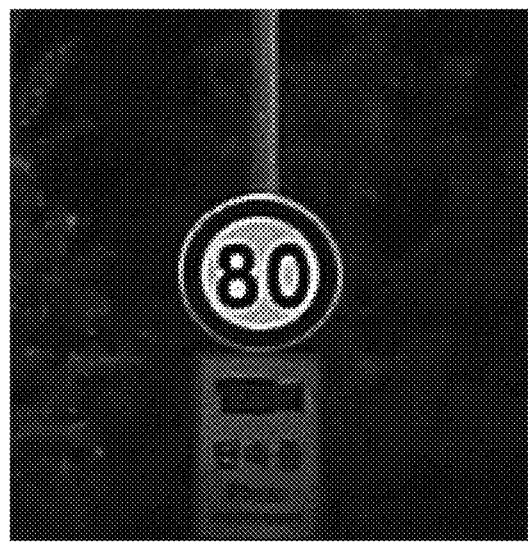
FIGS. 4A to 4C are views each illustrating a grayscale-processed image according to an embodiment of the present disclosure.
Figure 4B:
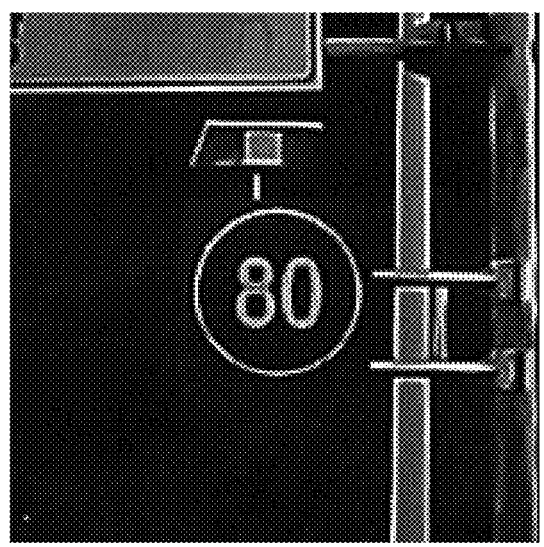
Figure 4C:
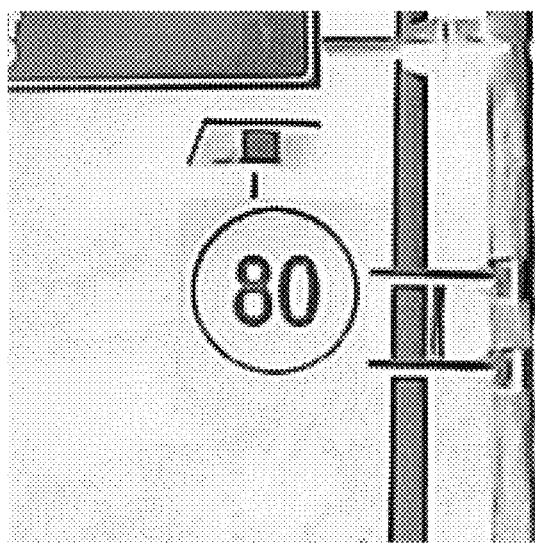

FIGS. 3A and 3B are views each illustrating the image of the region of interest according to the embodiment of the present disclosure. FIGS. 4A to 4C are views each illustrating the grayscale-processed image according to the embodiment of the present disclosure. Referring to FIGS. 3A to 4C, the grayscale image as illustrated in FIG. 4A may be generated by performing the first grayscale processing on the image of the region of interest (FIG. 3A) including the normal safety sign. Further, the grayscale image as illustrated in FIG. 4B may be generated by performing the first grayscale processing on an image of the region of interest (FIG. 3B) including the luminous safety sign. A brightness value of an in-sign region image in the image (FIG. 4B) generated by performing the first grayscale processing on the luminous safety sign is different from a brightness value of an in-sign region image in the image (FIG. 4A) generated by performing the first grayscale processing on the normal safety sign, and thus it may be difficult to detect both of the normal safety sign and the luminous safety sign only with a result of machine learning with respect to the normal safety sign.

On the other hand, the inverted grayscale image as illustrated in FIG. 4C may be generated by performing the second grayscale processing on an image of the region of interest (FIG. 3B) including the luminous safety sign. A brightness value of an in-sign region image in the image (FIG. 4C) generated by performing the second grayscale processing on the luminous safety sign is similar to the brightness value of the in-sign region image in the image (FIG. 4A) generated by performing the first grayscale processing on the normal safety sign, and thus it is possible to detect both of the normal safety sign and the luminous safety sign only with the result of machine learning with respect to the normal safety sign.

Therefore, the grayscale processing unit 12 according to the embodiment of the present disclosure may generate both of the grayscale image and the inverted grayscale image by alternately performing the first grayscale processing and the second grayscale processing, and the road speed limit identification apparatus 10 may detect both of the normal safety sign and the luminous safety sign only with the result of machine learning with respect to the normal safety sign by applying an algorithm on the basis of the generated grayscale image and inverted grayscale image.

Referring back to FIGS. 1 and 2, the equalization unit may perform histogram equalization on the grayscale-processed image generated by the grayscale processing unit 12.

Here, the histogram equalization may mean image processing for improving image quality by making an image with a narrow contrast distribution to have a uniform contrast distribution.

However, in the case of performing the histogram equalization on the entire image in which a bright portion and a dark portion are mixed, the dark portion becomes bright due to the equalization, but the bright portion becomes excessively bright due to the equalization, such that it becomes more difficult to identify a boundary line in the bright portion, which is problematic. A brightness and contrast of an image captured by the capturing device are continuously changed during driving on the road due to a change in weather, lighting, and the like. In particular, since the brightness and the contrast of the image are decreased in the case of backlight or sidelight, features disappear, and in this case, it is not possible to cope with such a problem with general equalization.

In order to solve such a problem, the equalization unit 19 may apply additional histogram equalization. Specifically, the equalization unit 19 may perform equalization by applying contrast limited adaptive histogram equalization (CLAHE) on the grayscale-processed image generated by the grayscale processing unit 12.

Here, the CLAHE may mean that a contrast limit value is applied to adaptive histogram equalization, in which the image is divided into small regions and equalization is applied within the small region, to prevent reflection of noise (extremely dark or bright region) of the small region.

The equalization unit 19 may perform equalization by applying the CLAHE on the generated grayscale-processed image to solve the problem that, since a specific portion of the grayscale-processed image becomes excessively bright, a boundary line is not identified.

That is, the equalization unit 19 may perform equalization by applying the CLAHE on the generated grayscale-processed image to improve contrast of the grayscale-processed image.

Meanwhile, the speed limit sign detection unit 13 may detect the speed limit sign image from the grayscale-processed image generated by the grayscale processing unit 12 or an image equalized by the equalization unit 19. As an example, the speed limit sign detection unit 13 may detect the speed limit sign by using, for the image, a classifier in which a plurality of classifying devices using multi-scale block local binary pattern (MB-LBP) features are connected in a cascade structure.

Here, the MB-LBP may be an improved LBP that is a feature of a cascade algorithm. First, the LBP, which is a value calculated with respect to all pixels of the image, is an index value obtained by coding a relative brightness change of a surrounding region of each pixel to binary. Here, the LBP feature may be coded to 1 in the case where a corresponding region is brighter than a pixel positioned at the center, and may be coded to 0 in the case where the corresponding region is darker than the pixel positioned at the center. This will be described in more detail with reference to FIG. 5.

Figure 5:
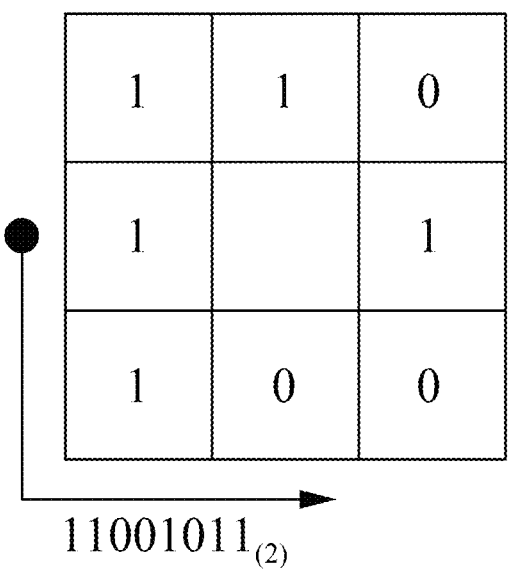
FIG. 5 is a conceptual diagram illustrating a local binary pattern (LBP) algorithm according to an embodiment of the present disclosure.

FIG. 5 is a conceptual diagram illustrating an LBP algorithm according to an embodiment of the present disclosure. Referring to FIG. 5, for example, in the case where a value of a central pixel is 54 and values of surrounding pixels are {55, 59, 10, 13, 84, 19, 90, 85}, a binary index value of (11001011) may be obtained through the LBP algorithm. Further, in the case where the index value is converted into a decimal number, a value of 203 may be obtained.

However, such an LBP method uses surrounding 3×3 pixels, and thus the excessively larger number of local features need to be extracted. According to an embodiment of the present disclosure, an MB-LBP method may be used.

Specifically, the MB-LBP method according to the embodiment of the present disclosure is a method in which an image region having an arbitrary size is divided into 3×3 blocks and then the above-described LBP index with respect to an average of the respective blocks is calculated. According to the present disclosure, an LBP index in a block unit, rather than a pixel unit, is calculated, such that it is possible to more rapidly extract large scale information.

That is, the speed limit sign detection unit 13 may detect the speed limit sign by using, for the grayscale-processed image generated by the grayscale processing unit 12 or the image equalized by the equalization unit 19, a classifier in which a plurality of classifying devices using the MB-LBP features are connected in a cascade structure. Here, the cascade algorithm may be a technology of classifying an image by using the plurality of classifying devices connected in the cascade structure. That is, the speed limit sign detection unit 13 according to the present disclosure may be implemented in a form in which a plurality of speed limit sign classifying devices using the MB-LBP features are connected in a cascade structure. In this case, a speed limit sign classifying device in the first cascade stage may eliminate a feature of the image as an image other than the speed limit sign, or may pass the feature of the image to a classifying device in the next cascade stage. Such a processing may be performed from a speed limit sign classifying device in the second cascade stage to a speed limit sign classifying device in the last cascade stage, and an image that passes the speed limit sign classifying device in the last cascade stage without being eliminated may be classified as the speed limit sign image. Accordingly, the speed limit sign detection unit 13 may detect the speed limit sign from the grayscale-processed image generated by the grayscale processing unit 12 or the image equalized by the equalization unit 19.

Figure 6A:
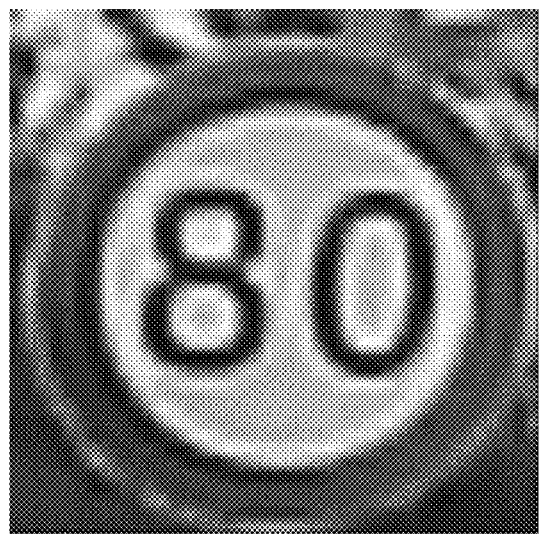
FIGS. 6A and 6B are views each illustrating a detected speed limit sign according to an embodiment of the present disclosure.
Figure 6B:
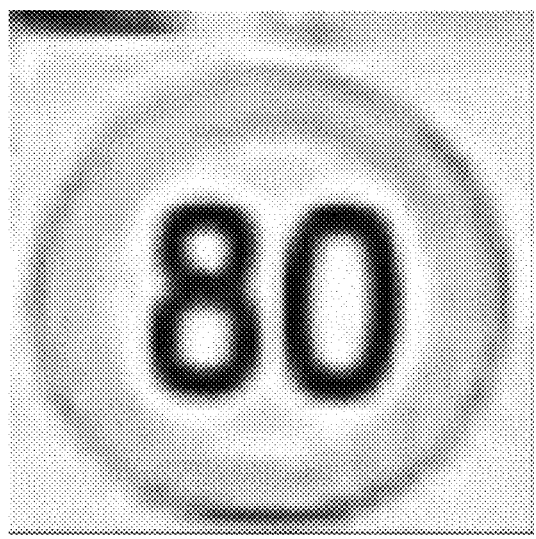

The speed limit sign detection unit 13 will be described in more detail with reference to FIGS. 6A and 6B. FIGS. 6A and 6B are views each illustrating a detected speed limit sign according to an embodiment of the present disclosure. Referring to FIGS. 6A and 6B, the speed limit sign detection unit 13 may detect the speed limit sign as illustrated in FIG. 6A by using the cascade algorithm based on the MB-LBP features for the grayscale image (FIG. 4A). Here, referring to FIG. 6A, the detected speed limit sign image may include both an out-boundary region image corresponding to a region outside a boundary of the speed limit sign, and an in-boundary region image.

Further, the speed limit sign detection unit 13 may detect the speed limit sign image as illustrated in FIG. 6B by using the cascade algorithm based on the MB-LBP features for the inverted grayscale image (FIG. 4C). Here, referring to FIG. 6B, the detected speed limit sign image may include both of an out-boundary region image corresponding to a region outside a boundary of the speed limit sign, and an in-boundary region image.

Meanwhile, the grayscale image (FIG. 4B) of the luminous safety sign may deteriorate image processing performance, and thus the speed limit sign detection unit 13 may not use the grayscale image (FIG. 4B) of the luminous safety sign.

Referring back to FIGS. 1 and 2, the brightness calculation unit 14 may calculate the first brightness value of the number region in the detected speed limit sign image, the second brightness value of the border region, and the third brightness value of the in-border region other than the number region. In this case, the brightness calculation unit 14 may divide the detected speed limit sign image into a plurality of regions, and may use a representative region among the plurality of regions to calculate the first brightness value of the number region, the second brightness value of the border region, and the third brightness value of the in-border region other than the number region. Here, the plurality of regions may each be a pixel or a region including a plurality of pixels depending on a size or image quality of the speed limit sign image, and the representative region may be a region including all of the "number region", the "border region", and the "in-border region other than the number region" in the speed limit sign image. Here, since the "number region" includes characters which are darkest, the first brightness value may be the lowest value, the third brightness value of the "in-border region other than the number region" may be the highest value, and the second brightness value of the "border region" may be a middle value.

That is, the third brightness value is the highest value, followed by the second brightness value and the first brightness value.

Meanwhile, the speed limit identification unit 15 may identify the speed limit displayed on the speed limit sign on the basis of the plurality of brightness values calculated by the brightness calculation unit 14. Specifically, the speed limit identification unit 15 may identify the speed limit on the basis of a position of a pixel with the first brightness value that indicates the number region in the speed limit sign image. For example, in the case where pixels with the first brightness value are positioned at the center in a vertical direction, the speed limit identification unit 15 may determine that the number is one (1). In this case, the speed limit identification unit 15 may identify the speed limit displayed on the speed limit sign by further considering a position of a pixel with the second brightness value and a position of a pixel with the third brightness value in order to more accurately identify the speed limit displayed on the speed limit sign.

Further, the speed limit identification unit 15 may identify the speed limit displayed on the speed limit sign on the basis of proportions of a region of pixels with the first brightness value, a region of pixels with the second brightness value, and a region of pixels with the third brightness value.

Meanwhile, according to another embodiment of the present disclosure, the speed limit identification unit 15 may identify the speed limit displayed on the speed limit sign by using the in-sign region image to be used to classify the speed limit sign.

Specifically, once the first brightness value of the number region, the second brightness value of the border region, and the third brightness value of the in-border region other than the number region are calculated by using the representative region, the in-sign region detection unit 16 may detect the in-sign region image to be used to classify the speed limit sign from the speed limit sign image, by using the plurality of calculated brightness values.

More specifically, in the case where a brightness value of a border and a brightness value of a background outside the border in the grayscale-processed image according to the present disclosure are similar to each other, it may be difficult to distinguish the border (in other words, the border of the signpost) and the background outside the border from each other by using the brightness values. Therefore, the in-sign region detection unit 16 according to the embodiment of the present disclosure may classify regions in the speed limit sign image into the "in-sign region image" which is an image to be used to classify the speed limit sign, and a "noise image" which is not used to classify the speed limit sign, by using the second brightness value of the border region and the third brightness value of the in-border region other than the number region. Further, the in-sign region detection unit 16 may detect the "in-sign region image", which is an image to be used to classify the speed limit sign, from the speed limit sign image, and set the "in-sign region image" in the speed limit sign image, by using the second brightness value of the border region and the third brightness value of the in-border region other than the number region.

This will be described in more detail with reference to FIG. 7.

Figure 7A:
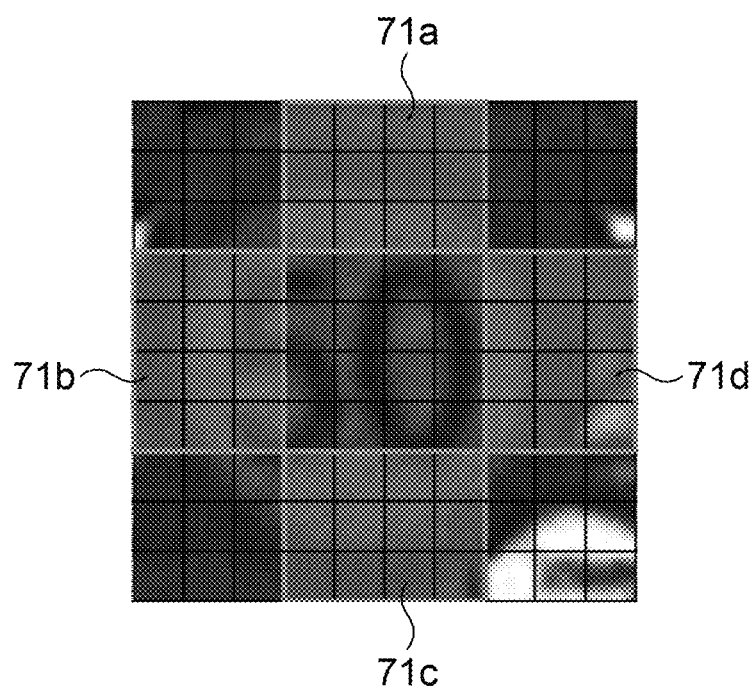
FIGS. 7A to 7C are diagrams for describing an operation of an in-sign region detection unit according to an embodiment of the present disclosure.
Figure 7B:
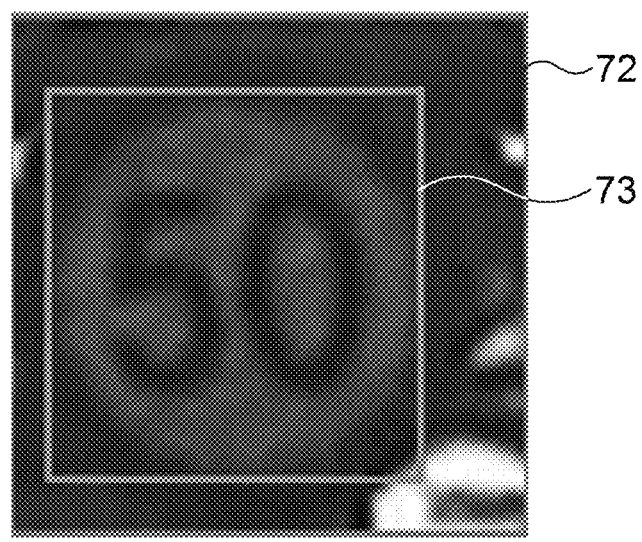
Figure 7C:
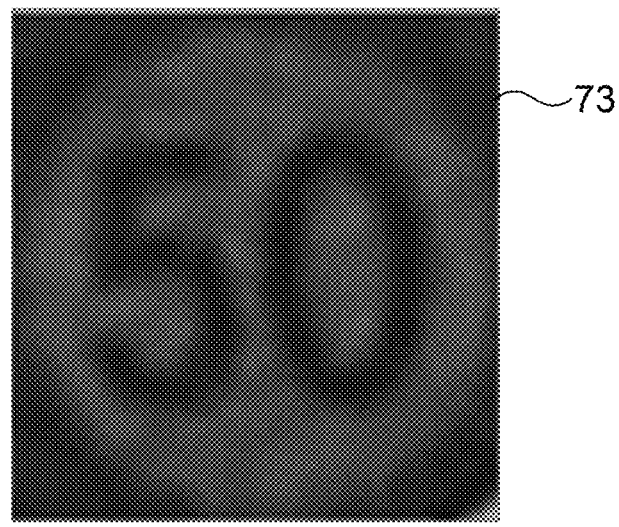

FIGS. 7A to 7C are diagrams for describing an operation of the in-sign region detection unit according to an embodiment of the present disclosure. The in-sign region detection unit 16 may set the representative region in the speed limit sign image detected by the speed limit sign detection unit 13, the representative region being used to calculate the brightness values. That is, the in-sign region detection unit 16 may divide the detected speed limit sign image into the plurality of regions, and may set a region that is likely to include all of the "number region", the "border region", and the "in-border region other than the number region" among the plurality of regions as the representative region. For example, as illustrated in FIG. 7A, the sign is likely to be positioned at the center of the detected speed limit sign image, and thus an upper end region 71a, a lower end region 71C, a left side region 71b, and a right side region 71d which are regions that are likely to include all of the "number region", the "border region", and the "in-border region other than the number region" as representative regions.

Further, the in-sign region detection unit 16 may calculate the first brightness value of the number region, the second brightness value of the border region, and the third brightness value of the in-border region other than the number region by using the set representative region.

As illustrated in FIG. 7B, the in-sign region detection unit 16 may set an in-sign region image 73 to be used to classify the speed limit sign, in a speed limit sign image 72 on the basis of the plurality of calculated brightness values. As an example, the in-sign region detection unit 16 may classify regions in the speed limit sign image 72 into the in-sign region image 73 and a noise image which is not used to classify the speed limit sign, by using the second brightness value of the border region and the third brightness value of the in-border region other than the number region. Here, the in-sign region image 73 may be set as an image of a quadrangular region surrounding an in-sign region. In particular, in order to reduce a data throughput as much as possible, the in-sign region image 73 according to the embodiment of the present disclosure may be set as an image of a quadrangular region that surrounds the in-sign region and is in contact with a boundary of the in-sign region. Meanwhile, the noise image may be set as an image of a region other than the in-sign region image 73 in the speed limit sign image 72.

Meanwhile, the in-sign region detection unit 16 may detect the in-sign region image 73 to be used to classify the speed limit sign, from the speed limit sign image 72. The detected in-sign region image may be as illustrated in FIG. 7C.

It is possible to increase an in-sign region image detection speed and more efficiently use resources of the road speed limit identification apparatus 10 by using only the brightness value of the representative region, rather than using all of the plurality of calculated brightness values, as described above.

Meanwhile, unlike the embodiment described above, the in-sign region detection unit 16 according to the embodiment of the present disclosure may also generate an in-sign region image including an in-sign region only on the basis of a circle detection process (a process to find the center and the radius of a circle in the image, that is, a process to obtain an equation of the circle). In this case, however, since a quantity of calculation for the circle detection is very large, a lot of time may be required for the calculation.

Therefore, according to a preferred embodiment of the present disclosure, it is possible to increase a data processing speed by using a quadrangular in-sign region image, rather than a circular in-sign region image including the in-sign region only.

Referring back to FIGS. 1 and 2, the in-sign region classification unit 17 may classify the detected region image according to a content of the sign. Specifically, the in-sign region classification unit 17 may primarily classify the detected region image according to a content of the sign on the basis of a feature of a first LBP by using a support vector machine (SVM) classifier, select a feature of a modified second LBP depending on a primary classification result, and secondarily classify the detected region image on the basis of the selected feature of the second LBP. Here, the first LBP may be an MB-LBP and the second LBP may be a modified LBP. Here, as the modified LBP, at least one of a compact binary pattern (CBP), an extended center-symmetric local binary pattern (XCSLBP), or a center-symmetric local derivative pattern (CSLDP) may be used.

Here, at least one of the CBP, the XCSLBP, or the CSLDP may be determined as the second LBP depending on a result of the primary classification using the first LBP. As the secondary classification using the second LBP determined depending on the primary classification result is performed, it is possible to reduce mis-classification that may occur during the primary classification. That is, it is possible to more accurately classify the detected region image according to the content of the sign.

As an example, in the case where a content of the sign is classified as "8" in the primary classification, but it is determined as a result of machine learning that there is a possibility that "3", "5", or "6" is mis-classified as "8", the in-sign region classification unit 17 may perform the secondary classification by appropriately using at least one of the CBP, the XCSLBP, or the CSLDP.

As an example, the modified LBP may be determined on the basis of a size of the detected region image, an average value of gray levels of respective pixels, a proportion of pixels with a gray level of a specific value or more, or the like. For example, in the case where the average value of the gray levels is 155 or less, the CBP may be used as the modified LBP. As another example, in the case where the proportion of pixels with a gray level of a specific value or more is 60% or more, the CBP and the CSLDP may be used as the modified LBP.

Figure 8A:
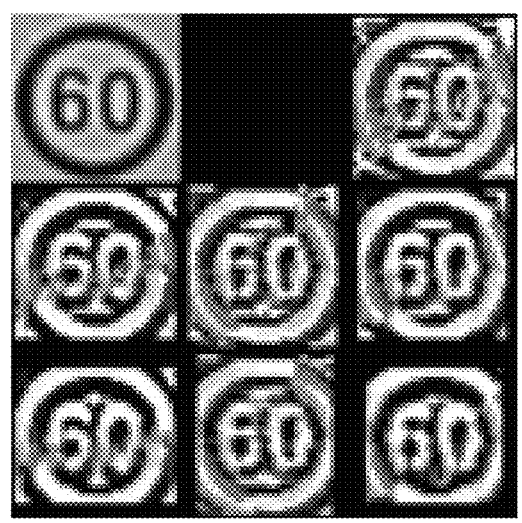
FIGS. 8A to 8D are views in which LBP features according to an embodiment of the present disclosure are visualized.
Figure 8B:
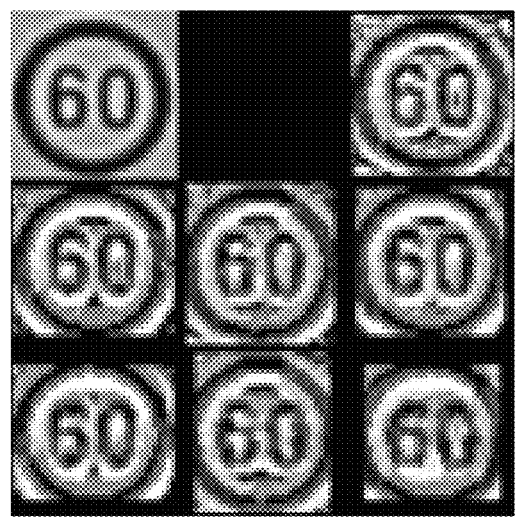
Figure 8C:
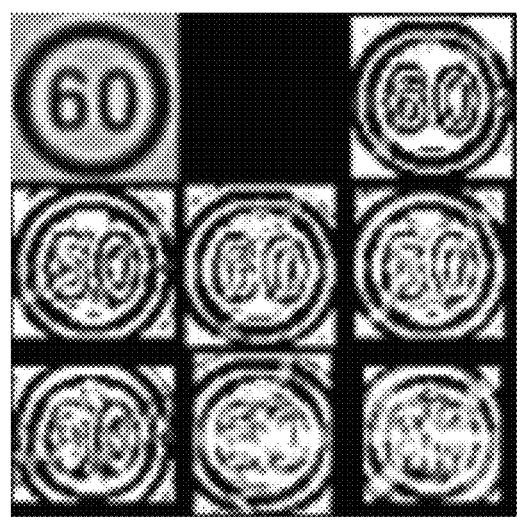
Figure 8D:
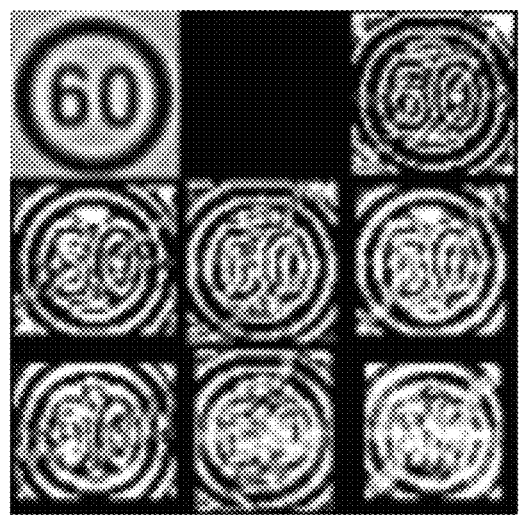

FIGS. 8A to 8D are views in which each LBP feature is visualized. FIG. 8A is a view in which the MB-LBP feature is visualized, FIG. 8B is a view in which the CBP feature is visualized, FIG. 8C is a view in which the XCSLBP feature is visualized, and FIG. 8D is a view in which the CSLDP feature is visualized.

Further, the modified LBP may be calculated in a pixel unit, or may be calculated in a unit of an image region with an arbitrary size. That is, the second LBP may be calculated in a pixel unit or a block unit.

Here, the image region with the arbitrary size of the first LBP may be set to be larger as compared to the second LBP. That is, the first LBP may be used to classify the detected region image according to the content of the sign by calculating an LBP index in a block unit larger than that of the second LBP. For example, the first LBP may be calculated in a unit of block including nine pixels, and the second LBP may be calculated in a unit of block including four pixels, which is smaller than that of the first LBP. On the contrary, the first LBP may also be used to classify the detected region image according to the content of the sign by calculating an LBP index in a block unit smaller than that of the second LBP.

Meanwhile, the in-sign region classification unit 17 may classify the detected region image according to the content of the sign through machine learning using the SVM classifier. Here, the SVM classifier, which performs flat-based classification of data belonging to different classes, generally implements high accuracy and has a structure with low sensitivity to overfitting, which is advantageous. As such, the in-sign region classification unit 17 may perform the primary classification according to a content of the sign on the basis of the feature of the first LBP by using the SVM classifier, and perform the secondary classification on the basis of the feature of the modified second LBP, thereby improving reliability of a classification result.

Referring back to FIGS. 1 and 2, the speed limit identification unit 15 may identify the speed limit displayed on the speed limit sign according to a content of sign classified by the in-sign region classification unit 17. For example, in the case where the detected in-sign region image is classified as 80, the speed limit identification unit 15 may identify that the speed limit in the detected in-sign region image is 80.

The map update data generation unit 18 may generate speed limit update data. Specifically, in the case where a speed limit allocated to map data at a location of the moving object and a speed limit identified from the driving image do not coincide with each other, the map update data generation unit 18 may generate map update data for updating the speed limit of the map data. Further, the map update data generated by the map update data generation unit 18 may be transmitted to a server generating map data and map update data through the communication unit. Further, once the map update data are received from the server through the communication unit, the map update data generation unit 18 may transmit the received update data to a map generation unit (not illustrated) and the map generation unit may generate updated map data by using the update data.

For example, in the case where a speed limit allocated to the map data at a location of the vehicle is 70 km/h and a speed limit identified from the driving image is 60 km/h, the map update data generation unit 18 may generate data for an update to the speed limit of 60 km/h.

As another example, in the case where there is no speed limit allocated to the map data at the location of the vehicle and the speed limit identified from the driving image is 60 km/h, the map update data generation unit 18 may generate data for an update to the speed limit of 60 km/h.

Meanwhile, the map update data generation unit 18 may also generate traffic information update data, in addition to the speed limit update data. For example, in the case where a width limit allocated to the map data at the location of the moving object is 2 m and a width limit identified from the driving image is 2.5 m, the map update data generation unit 18 may generate data for an update of traffic information to the width limit of 2.5 m. That is, the map update data generation unit 18 may also generate data for updating traffic information including information such as a width limit, a weight limit, a height limit, a following distance limit, and a minimum speed limit, in addition to the speed limit update data. Further, the traffic information update data generated by the map update data generation unit 18 may also be transmitted to a traffic information server through the communication unit. Further, once the traffic information update data are received from the server through the communication unit, a traffic information providing unit may provide updated traffic information or route guidance service to the user by using the received traffic information update data, or a self-driving control apparatus 300 may perform self-driving by using the received traffic information update data.

Hereinafter, a road speed limit identification method according to an embodiment of the present disclosure will be described with reference to FIGS. 9 and 10.

FIG. 9 is a flowchart illustrating a road speed limit identification method of the electronic apparatus according to an embodiment of the present disclosure.

Referring to FIG. 9, a driving image captured during driving of a moving object may be obtained (S10).

Further, a region of interest may be set in the obtained driving image and a grayscale-processed image may be generated on the basis of the image of the set region of interest (S20). Specifically, the grayscale processing unit 12 may set only a portion of the obtained driving image as the region of interest, such that it is possible to remove a unnecessary region from the obtained driving image, and implement more efficient image processing to be performed later.

Further, the grayscale processing unit 12 may generate a grayscale-processed image on the basis of the image of the set region of interest. Specifically, the grayscale processing unit 12 may perform the first grayscale processing to generate a grayscale image. The first grayscale processing may mean that an image is processed to have only a brightness value. Here, the second grayscale processing may mean that an image is processed to have only a brightness value without color information, and then the image is processed to have an inverted grayscale value.

Further, the grayscale processing unit 12 may perform the first grayscale processing and the second grayscale processing alternately. That is, the grayscale processing unit 12 may perform the first grayscale processing and the second grayscale processing alternately to generate the grayscale image and an inverted grayscale image. Further, the grayscale processing unit 12 may perform histogram equalization on the generated grayscale-processed image. That is, the grayscale processing unit 12 may generate an equalized image.

Next, a speed limit sign image may be detected from the grayscale-processed image (S30). Here, the grayscale-processed image may be an equalized image. That is, the speed limit sign detection unit 13 may detect a speed limit sign by using the cascade algorithm for the equalized image. Here, the speed limit sign may include the normal safety sign and the luminous safety sign.

Specifically, the speed limit sign detection unit 13 may detect the speed limit sign by using, for the image, the cascade algorithm on the basis of the MB-LBP feature.

Next, a brightness value of the detected speed limit sign image may be calculated (S40). Specifically, the brightness calculation unit 14 may calculate a first brightness value of a number region in the detected speed limit sign image, a second brightness value of a border region, and a third brightness value of an in-border region other than the number region.

Further, the speed limit identification unit 15 may identify a speed limit displayed on the speed limit sign on the basis of the plurality of calculated brightness values (S50). As an example, the speed limit identification unit 15 may identify the speed limit on the basis of a position of a pixel with the first brightness value that indicates the number region in the speed limit sign image. Here, the speed limit identification unit 15 may identify the speed limit displayed on the speed limit sign on the basis of a position of a pixel with the second brightness value and a position of a pixel with the third brightness value as well.

Further, the speed limit identification unit 15 may identify the speed limit displayed on the speed limit sign according to a classified content of the sign. This will be described with reference to FIG. 10.

Figure 10:
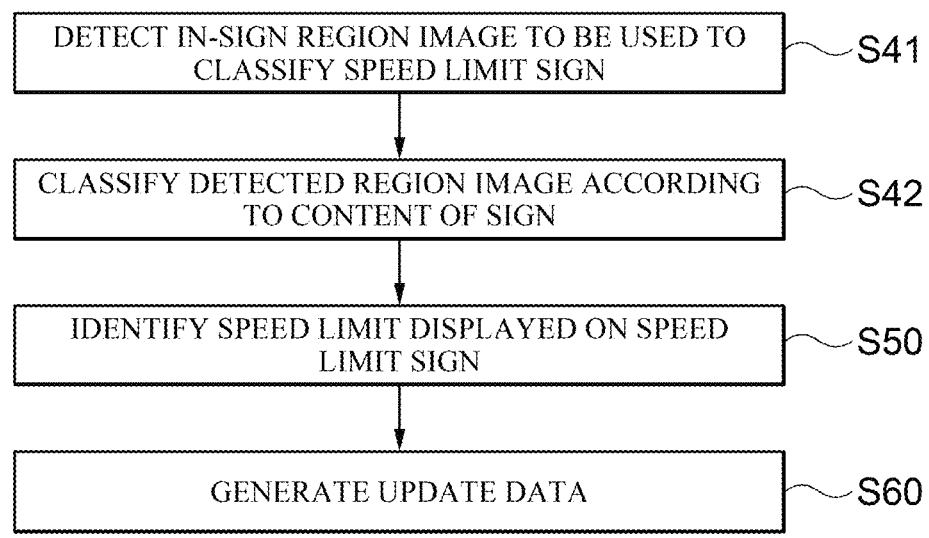
FIG. 10 is a flowchart illustrating the road speed limit identification method according to an embodiment of the present disclosure.

FIG. 10 is a flowchart illustrating the road speed limit identification method according to an embodiment of the present disclosure. Referring to FIG. 10, the in-sign region detection unit 16 of the road speed limit identification apparatus 10 may detect an in-sign region image to be used to classify the speed limit sign, from the speed limit sign image by using the plurality of calculated brightness values (S41). Specifically, the in-sign region detection unit 16 may divide the detected speed limit sign image into a plurality of regions, and may set a region that is likely to include all of the "number region", the "border region", and the "in-border region other than the number region" among the plurality of regions as a representative region. Further, the in-sign region detection unit 16 may calculate the first brightness value of the number region, the second brightness value of the border region, and the third brightness value of the in-border region other than the number region by using the set representative region. Meanwhile, the in-sign region detection unit 16 may set the in-sign region image to be used to classify the speed limit sign, from the speed limit sign image on the basis of the plurality of calculated brightness values.

Next, the in-sign region classification unit 17 may classify the detected region image according to a content of the sign (S42). Specifically, the in-sign region classification unit 17 may primarily classify the detected region image according to a content of the sign on the basis of a feature of a first LBP by using the SVM classifier, select a type of a feature of a modified second LBP depending on a primary classification result, and secondarily classify the detected region image on the basis of the selected feature of the second LBP.

Next, the speed limit identification unit 15 may identify the speed limit displayed on the speed limit sign according to the content of the sign classified by the in-sign region classification unit 17. Then, in the case where a speed limit allocated to map data at a location of the moving object and the speed limit identified from the driving image do not coincide with each other, the map update data generation unit 18 may generate speed limit update data (S60). For example, in the case where the speed limit allocated to the map data at the location of the moving object is 70 km/h and the speed limit identified from the driving image is 60 km/h, the map update data generation unit 18 may generate data for an update to the speed limit of 60 km/h.

Further, in the generating of the update data (S60), traffic information update data may also be generated, in addition to the speed limit update data. For example, in the case where a width limit allocated to the map data at the location of the moving object is 2 m and a width limit identified from the driving image is 2.5 m, the map update data generation unit 18 may generate data for an update of traffic information to the width limit of 2.5 m.

Meanwhile, the road speed limit identification apparatus 10 may be implemented as an electronic apparatus outputting various notification information for assisting in driving by the driver, or as a module of a self-driving system to perform a route guidance function. This will be described in more detail with reference to FIGS. 10 to 17.

Figure 11:
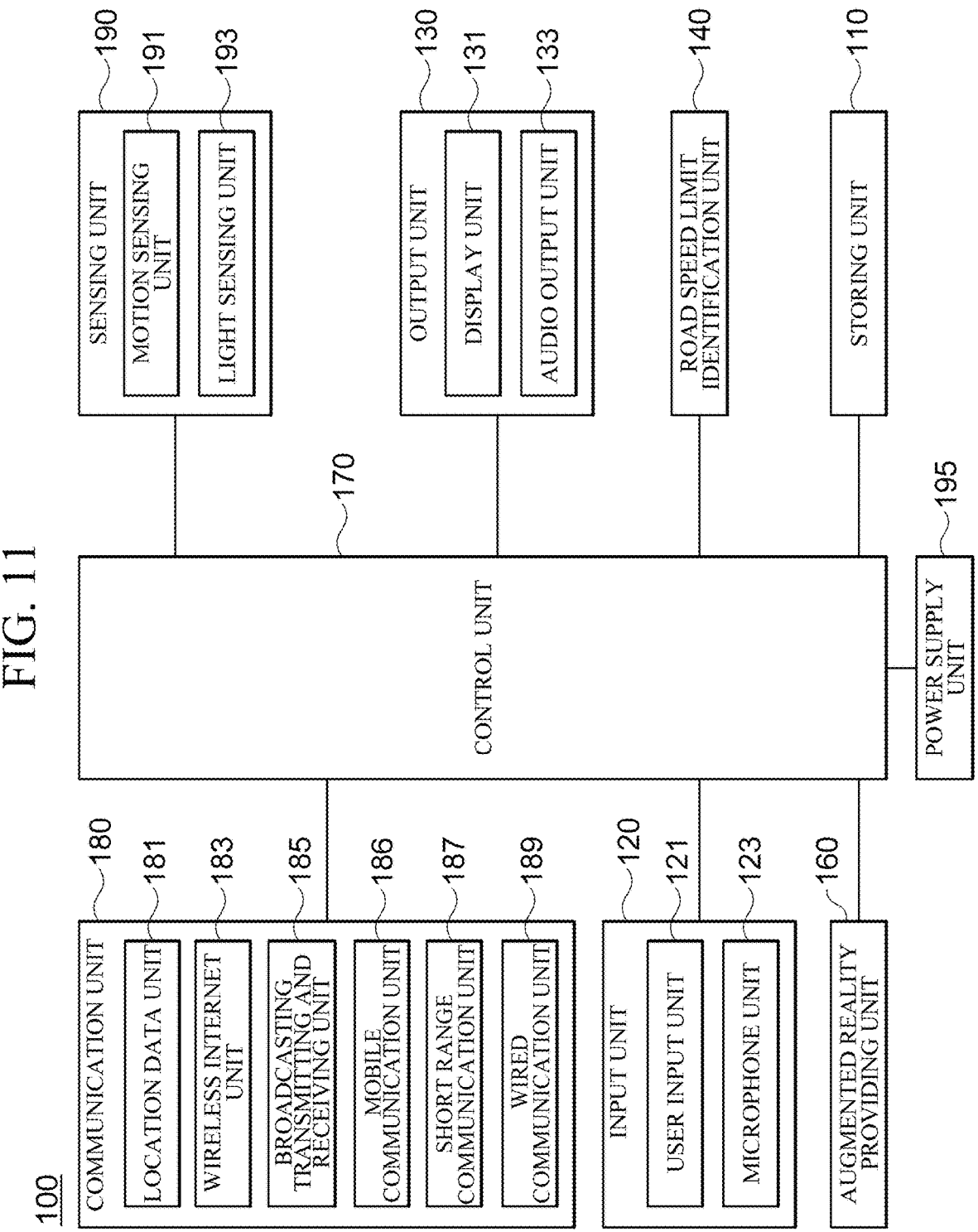
FIG. 11 is a block diagram illustrating an electronic apparatus according to an embodiment of the present disclosure.

FIG. 11 is a block diagram illustrating an electronic apparatus according to an embodiment of the present disclosure. Referring to FIG. 11, the electronic apparatus 100 includes all or some of a storing unit 110, an input unit 120, an output unit 130, a road speed limit identification unit 140, an augmented reality providing unit 160, a control unit 170, a communication unit 180, a sensing unit 190, and a power supply unit 195.

Here, the electronic apparatus 100 may be implemented by various apparatuses such as a smartphone, a tablet computer, a laptop computer, a personal digital assistant (PDA), a portable multimedia player (PMP), smart glasses, project glasses, a navigation device, and an image capturing device for a vehicle such as a car dash cam or a car video recorder, that may provide driving-related notification to a driver of a vehicle and may be provided in the vehicle.

The driving-related notification may include various kinds of notification and guidance for assisting in driving by the driver of the vehicle, such as route guidance, lane departure notification, lane keeping guidance, forward vehicle start notification, signal lamp change notification, forward vehicle collision preventing notification, lane change guidance, lane guidance, curve notification, and road speed limit notification.

Here, the route guidance may include augmented reality route guidance performing route guidance by combining various information such as a location of a user, and a direction, with an image obtained by capturing the front of the vehicle that is being operated and two-dimensional (2D) or three-dimensional (3D) route guidance performing route guidance by combining various information such as a position of a user, and a direction, with a 2D or 3D map data.

In addition, the route guidance may include air map route guidance performing route guidance by combining various information such as a position of a user, and a direction, with air map data. Here, the route guidance may be interpreted as a concept including route guidance in the case where the user walks or runs to move as well as in the case where the user gets in the vehicle and then drives the vehicle.

In addition, the lane departure notification may notify whether or not the vehicle that is being driven has departed from a lane.

In addition, the lane keeping guidance may guide the vehicle to return to a lane in which the vehicle is originally being driven.

In addition, the forward vehicle start notification may notify whether or not a vehicle positioned in front of a vehicle that is being stopped has started. Here, the forward vehicle start notification may be performed by using a road speed limit calculated by the road speed limit identification unit 140.

In addition, the signal lamp change notification may notify whether or not a signal lamp positioned in front of a vehicle that is being stopped has been changed. As an example, the signal lamp change notification may notify a change of a state of the signal lamp from a red lamp indicating a stop signal into a green lamp indicating a start signal.

In addition, the forward vehicle collision preventing notification may notify that a distance between a vehicle that is being stopped or driven and a vehicle positioned in front of the vehicle is within a predetermined distance in order to prevent collision between the above-mentioned vehicles when the distance between the vehicle that is being stopped or driven and the vehicle positioned in front of the vehicle is within the predetermined distance. Here, the forward vehicle collision preventing notification may be performed by using the road speed limit calculated by the road speed limit identification unit 140.

In addition, the lane change guidance may guide a change from a lane in which a vehicle is located into another lane in order to guide a route up to a destination.

In addition, the lane guidance may guide a lane in which a vehicle is currently located.

In addition, the curve notification may notify that a road on which the vehicle is to be driven after a predetermined time is a curved road.

In addition, the road speed limit notification may notify of a speed limit on a road on which the vehicle is currently being driven.

A driving related image such as an image of an area in front of the vehicle enabling provision of various kinds of guidance and notification may be captured by a camera mounted in the vehicle or a camera of a smartphone. Here, the camera may be a camera formed integrally with the electronic apparatus 100 mounted in the vehicle and capturing an image of an area in front of the vehicle.

As another example, the camera may be a camera mounted in the vehicle separately from the electronic apparatus 100 and capturing an image of an area in front of the vehicle. In this case, the camera may be an image capturing device for a vehicle that is separately mounted toward the area in front of the vehicle, and the electronic apparatus 100 may receive a captured image through wired/wireless communication with the separately mounted image capturing device for a vehicle or receive the captured image when a storage medium storing the captured image of the image capturing device for a vehicle is inserted into the electronic apparatus 100.

Hereinafter, the electronic apparatus 100 according to an embodiment of the present disclosure will be described in more detail on the basis of the above-mentioned content.

The storing unit 110 serves to store various data and applications required for an operation of the electronic apparatus 100. Particularly, the storing unit 110 may store data required for the operation of the electronic apparatus 100, for example, an operating system (OS), a route search application, and map data. In addition, the storing unit 110 may store data generated by the operation of the electronic apparatus 100, for example, a searched route data and a received image.

Here, the storing unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, or a universal subscriber identity module (USIM).

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch or a push operation. Here, the user input unit 121 may be implemented using at least one of various forms of buttons, a touch sensor receiving a touch input, or a proximity sensor receiving an approaching motion.

The microphone unit 123 may receive a speech of the user and a sound generated in the inside and the outside of the vehicle.

The output unit 130 is a device outputting data of the electronic apparatus 100 in a form of video and/or audio to the user. Here, the output unit 130 may include all or some of a display unit 131 and an audio output unit 133.

The display unit 131 is a device outputting data that may be visually recognized by the user. The display unit 131 may be implemented by a display unit provided on a front surface of a housing of the electronic apparatus 100. In addition, the display unit 131 may be formed integrally with the electronic apparatus 100 and output visual recognition data, or may be installed separately from the electronic apparatus 100 like a head-up display (HUD) and output visual recognition data.

The audio output unit 133 is a device outputting data that may be auditorily recognized in the electronic apparatus 100. The audio output unit 133 may be implemented by a speaker expressing data that are to be reported to the user of the electronic apparatus 100 in a form of sound.

The road speed limit identification unit 140 may perform the function of the road speed limit identification apparatus 10 described above. As an example, the road speed limit identification unit 140 may obtain a driving image captured during driving of the vehicle, generate a grayscale-processed image, and detect a speed limit sign image from the grayscale-processed image to identify a speed limit on the road. However, the present disclosure is not limited thereto. The road speed limit identification unit 140 may not only identify the road speed limit, but also identify information that may be identified on the basis of various safety signs installed on the road, such as a width limit, a weight limit, a height limit, a following distance limit, and a minimum speed limit.

The augmented reality providing unit 160 may provide an augmented reality view mode. Here, augmented reality is a method of visually overlapping and providing additional information (for example, a graphic element indicating a point of interest (POI), a graphic element notifying of a road speed limit, a graphic element indicating a distance between vehicles, a graphic element notifying of a curved road, and various additional information for assisting in safe driving by the driver) with and on a screen including a real world actually viewed by the user.

The augmented reality providing unit 160 may include all or some of a calibration unit, a 3D space generation unit, an object generation unit, and a mapping unit.

The calibration unit may perform calibration for estimating camera parameters corresponding to the camera from an image captured by the camera. Here, the camera parameters are parameters configuring a camera matrix, which is information indicating a conversion relationship between a real space and a picture, may include extrinsic camera parameters and intrinsic camera parameters.

The 3D space generation unit may generate a virtual 3D space on the basis of the image captured by the camera. Specifically, the 3D space generation unit may generate the virtual 3D space by applying the camera parameters estimated by the calibration unit to a 2D captured image.

The object generation unit may generate objects for guidance and notification, for example, a forward vehicle collision preventing notification object, a route guidance object, a lane change guidance object, a lane departure notification object, and a curve notification object, on the augmented reality.

The mapping unit may map the object generated by the object generation unit to the virtual 3D space generated by the 3D space generation unit. Specifically, the mapping unit may determine a position of the object generated by the object generation unit in the virtual 3D space, and perform mapping of the object to the determined position.

Meanwhile, the communication unit 180 may be provided in order for the electronic apparatus 100 to perform communication with other devices. The communication unit 180 may include all or some of a location data unit 181, a wireless Internet unit 183, a broadcasting transmitting and receiving unit 185, a mobile communication unit 186, a short range communication unit 187, and a wired communication unit 189.

The location data unit 181 is a device obtaining location data through a global navigation satellite system (GNSS). The GNSS means a navigation system that may calculate a position of a receiving terminal by using a radio signal received from an artificial satellite. The GNSS may be a global positioning system (GPS), a Galileo system, a global orbiting navigational satellite system (GLONASS), a COMPASS, an Indian regional navigational satellite system (IRNSS), or a quasi-zenith satellite system (QZSS) depending on an operating subject. The location data unit 181 of the electronic apparatus 100 according to the embodiment of the present disclosure may obtain location data by receiving a GNSS signal provided in a zone in which the electronic apparatus 100 is used. Alternatively, the location data unit 181 may obtain the location data through communication with a base station or an access point (AP), in addition to the GNSS.

The wireless Internet unit 183 is a device accessing the wireless Internet to obtain or transmit data. The wireless Internet unit 183 may access the Internet network according to various communication protocols defined to perform wireless data transmission and reception, such as a wireless local area network (WLAN), a wireless broadband (Wibro), a world interoperability for microwave access (Wimax), or a highspeed downlink packet access (HSDPA).

The broadcasting transmitting and receiving unit 185 is a device transmitting and receiving a broadcasting signal through various broadcasting systems. The broadcasting system that may transmit and receive the broadcasting signal through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signal transmitted and received through the broadcasting transmitting and receiving unit 185 may include traffic data, living data, and the like.

The mobile communication unit 186 may access a mobile communication network to perform voice communication and data communication according to various mobile communication protocols such as 3rd generation (3G), 3rd generation partnership project (3GPP), and long term evolution (LTE).

The short range communication unit 187 is a device for short range communication. The short range communication unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communication unit 189 is an interface device that may connect the electronic apparatus 100 to another device in a wired manner. The wired communication unit 189 may be a USB module that may perform communication through a USB port.

The communication unit 180 may communicate with another device using at least one of the location data unit 181, the wireless Internet unit 183, the broadcasting transmitting and receiving unit 185, the mobile communication unit 186, the short range communication unit 187, or the wired communication unit 189.

As an example, in the case where the electronic apparatus 100 does not have a camera function, an image captured by the image capturing device for a vehicle, such as a car dash cam or a car video recorder, may be received using at least one of the short range communication unit 187 or the wired communication unit 189.

As another example, in the case where the electronic apparatus performs communication with a plurality of devices, the electronic apparatus may perform communication with anyone of the plurality of devices through the short range communication unit 187, and perform communication with another one of the plurality of devices through the wired communication unit 189.

The sensing unit 190 is a device that may sense a current state of the electronic apparatus 100. The sensing unit 190 may include all or some of a motion sensing unit 191 and a light sensing unit 193.

The motion sensing unit 191 may sense a motion of the electronic apparatus 100 in a 3D space. The motion sensing unit 191 may include a tri-axial terrestrial magnetism sensor and a tri-axial acceleration sensor. Motion data obtained through the motion sensing unit 191 may be combined with the location data obtained through the location data unit 181 to more accurately calculate a trajectory of the vehicle to which the electronic apparatus 100 is attached.

The light sensing unit 193 is a device measuring surrounding illuminance of the electronic apparatus 100. A brightness of the display unit 131 may be changed so as to correspond to surrounding brightness using illuminance data obtained through the light sensing unit 193.

The power supply unit 195 is a device supplying power required for an operation of the electronic apparatus 100 or an operation of another device connected to the electronic apparatus 100. The power supply unit 195 may be a device receiving power from a battery embedded in the electronic apparatus 100, or an external power supply such as the vehicle. Alternatively, the power supply unit 195 may be implemented by the wired communication unit 189 or a device receiving power in a wireless manner depending on a manner in which the power supply unit 195 receives the power.

The control unit 170 controls a general operation of the electronic apparatus 100. Specifically, the control unit 170 may control all or some of the storing unit 110, the input unit 120, the output unit 130, the road speed limit identification unit 140, the augmented reality providing unit 160, the communication unit 180, the sensing unit 190, and the power supply unit 195.

Specifically, the control unit 170 may control the output unit 130 to output speed limit notification for the road on which the moving object is being driven on the basis of the road speed limit identified by the road speed limit identification unit 140.

As an example, the output unit 130 may include the display unit 131 outputting an augmented reality image by combining the captured driving image and a notification object. In this case, once the speed limit on the road on which the moving object is being driven is identified from the driving image, the control unit 170 may generate a speed limit notification object indicating a speed limit value corresponding to the identified speed limit, and control the display unit 131 to display the generated speed limit notification object on the augmented reality image. Here, the control unit 170 may perform a control to change at least one of a color, a size, or a displayed position of the notification object depending on a difference between a driving speed of the moving object and the road speed limit.

As an example, in the case where the driving speed of the moving object is lower than the speed limit, the notification object may be represented as green, the size of the notification object may be small, the notification object may be displayed at a position on a screen that is less focused by the driver, or the notification object may not be displayed. However, in the case where the driving speed of the moving object exceeds the speed limit, the notification object may be represented as red, the size of the notification object may be large, or the notification object may be displayed at a position on the screen that is relatively more focused by the driver.

As another example, in the case where a current speed of the moving object exceeds the speed limit, the control unit 170 may control the display unit 131 to repeatedly output the notification object displayed on the augmented reality image at predetermined intervals. Here, the predetermined intervals may be determined depending on a difference between the current speed and the speed limit.

For example, the control unit 170 may control the display unit 131 so that the larger the difference between the current speed and the speed limit, the shorter the intervals at which the display unit 131 repeatedly outputs a signpost image. Particularly, the control unit 170 may draw attention of the driver by making the signpost image blink. As such, according to the present disclosure, the speed limit notification is provided in real time, such that it is possible to induce safe driving by the driver.

Further, in the case where the current speed of the moving object exceeds the speed limit, and a speed camera is present in front of the moving object within a predetermined distance, the control unit 170 may control the audio output unit 133 to output a predetermined alarm sound.

For example, in the case where a current speed of a vehicle exceeds a speed limit, and a speed camera is present in front of the vehicle within 300 m, the control unit 170 may control the audio output unit 133 to output an alarm sound. Here, the control unit 170 may control the alarm sound depending on a difference between the current speed and the speed limit, or the predetermined distance in front of the vehicle.

For example, in the case where the difference between the current speed and the speed limit is large, the control unit 170 may control the audio output unit 133 to output the alarm sound at a high volume level, or may control the audio output unit 133 to repeatedly output the alarm sound at a high frequency.

As another example, the control unit 170 may control the audio output unit 133 so that the shorter the distance at which the speed camera is located in front of the vehicle, the higher the volume level at which the alarm sound is output, or the control unit 170 may control the audio output unit 133 so that the shorter the distance at which the speed camera is located in front of the vehicle, the higher the frequency at which the alarm sound is repeatedly output.

Further, the control unit 170 may control the output unit 130 to notify that the speed limit on the road on which the moving object is being driven is changed, once the change of the speed limit is detected during driving of the moving object on a road section on which the variable speed limit system is installed. Specifically, in the variable speed limit system, the speed limit sign is implemented by the luminous safety sign, and thus a changed road speed limit may be identified by using the algorithm according to the present disclosure described above. In this case, the control unit 170 may control the audio output unit 133 to output a driving guidance voice when being driven on or entering the road section on which the variable speed limit system is installed. That is, in the case where the speed limit is changed on the basis of a weather condition when the moving object is driven on the road section on which the variable speed limit system is installed, the control unit 170 may control the audio output unit 133 to output the driving guidance voice.

As a result, it is possible to prevent the driver from being confused even in the case where a speed limit policy is changed, by identifying and providing notification of a changed content of the signpost.

Figure 12:
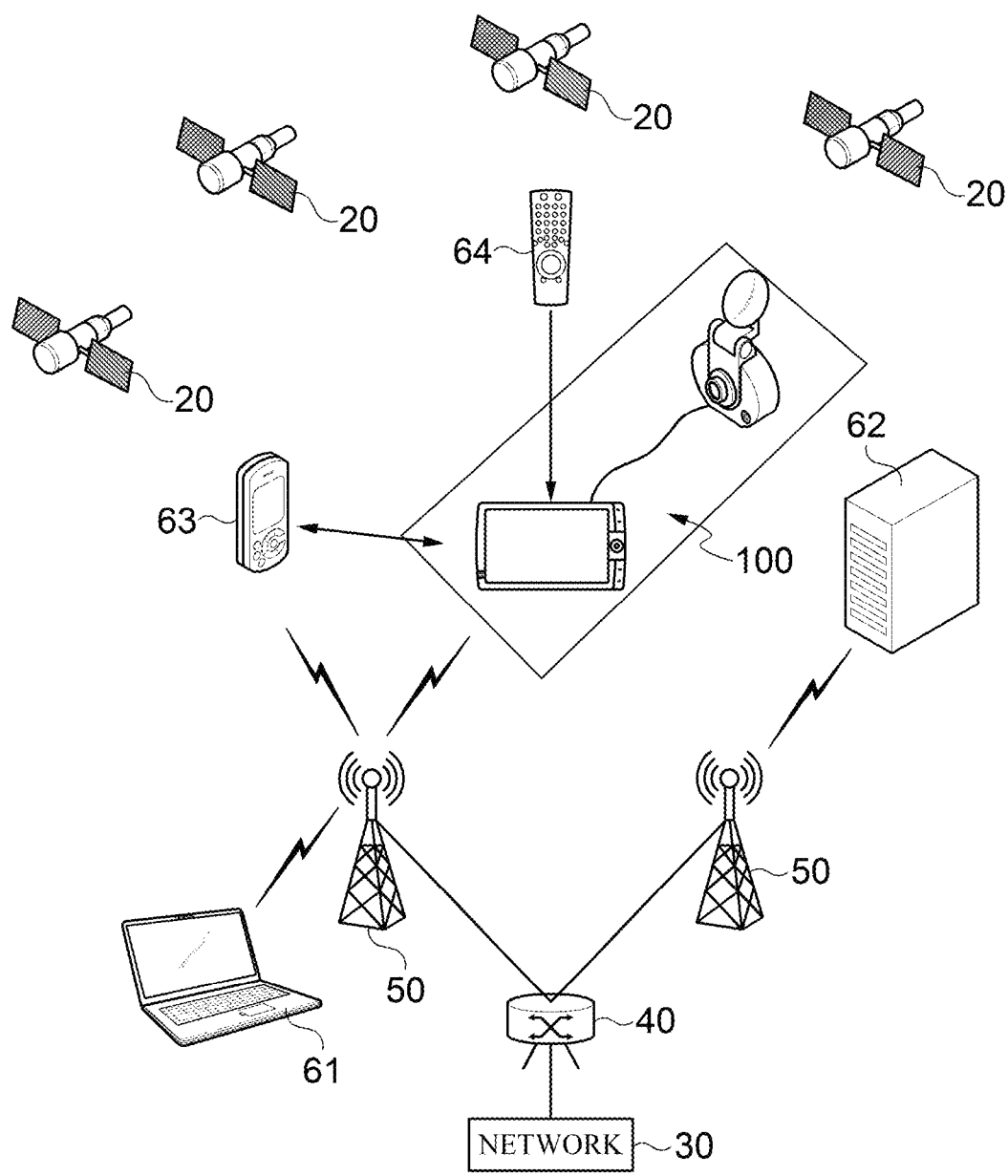
FIG. 12 is a diagram for describing a system network connected to the electronic apparatus according to an embodiment of the present disclosure.

FIG. 12 is a diagram for describing a system network connected to the electronic apparatus according to an embodiment of the present disclosure.

Referring to FIG. 12, the electronic apparatus 100 according to an embodiment of the present disclosure may be implemented as various apparatuses provided in the vehicle, such as a navigation device, an image capturing device for a vehicle, a smartphone, or other augmented reality interface providing apparatuses for a vehicle, and may be connected to various communication networks and other electronic devices 61 to 64.

In addition, the electronic apparatus 100 may use a GPS module according to a radio signal received from artificial satellites 20 to calculate a current location and a current time.

The respective artificial satellites 20 may transmit L band frequencies of which frequency bands are different from each other. The electronic apparatus 100 may calculate the current location on the basis of a time required for the L band frequencies transmitted by the respective artificial satellites 20 to arrive at the electronic apparatus 100.

Meanwhile, the electronic apparatus 100 may wirelessly access a network 30 through a control station (access control router (ACR)) 40, a base station (radio access station (RAS)) 50, an access point (AP), and the like, via the communication unit 180. When the electronic apparatus 100 accesses the network 30, the electronic apparatus 100 may be indirectly connected to other electronic devices 61 and 62 accessing the network 30 to exchange data.

Meanwhile, the electronic apparatus 100 may also indirectly access the network 30 through another device 63 having a communication function. For example, in the case where a module that may access the network 30 is not included in the electronic apparatus 100, the electronic apparatus 100 may perform communication with another device 63 having the communication function through a short range communication module or the like.

Figure 13:
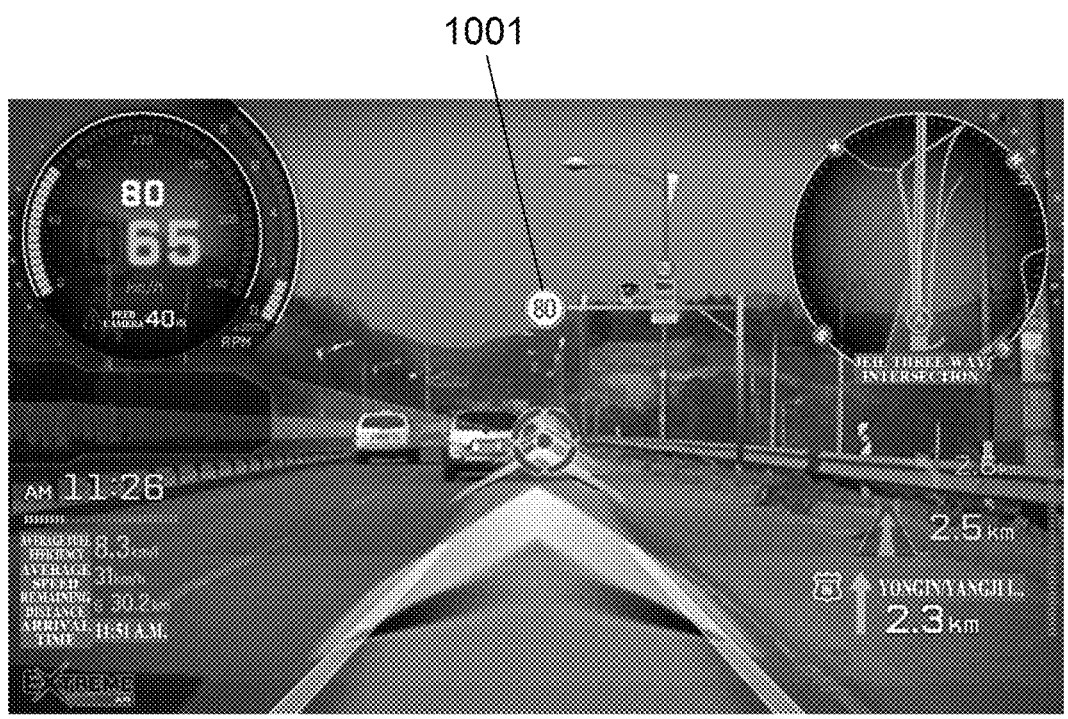
FIG. 13 is a view illustrating a road speed limit notification screen of the electronic apparatus according to an embodiment of the present disclosure.

FIG. 13 is a view illustrating a road speed limit notification screen of the electronic apparatus according to an embodiment of the present disclosure. Referring to FIG. 13, the electronic apparatus 100 may detect a speed limit sign 1001 from an obtained driving image and identify a speed limit displayed on the speed limit sign 1001. Further, the electronic apparatus 100 may generate a speed limit notification object 1002 indicating a speed limit value corresponding to the identified speed limit, and control the display unit 131 to display the generated speed limit notification object 1002 on an augmented reality image.

In this case, the electronic apparatus 100 may change at least one of a color, a size, or a displayed position of the notification object depending on a difference between a driving speed of the moving object and the road speed limit.

Further, the electronic apparatus 100 may also output various notification information in a form of voice.

Figure 14:
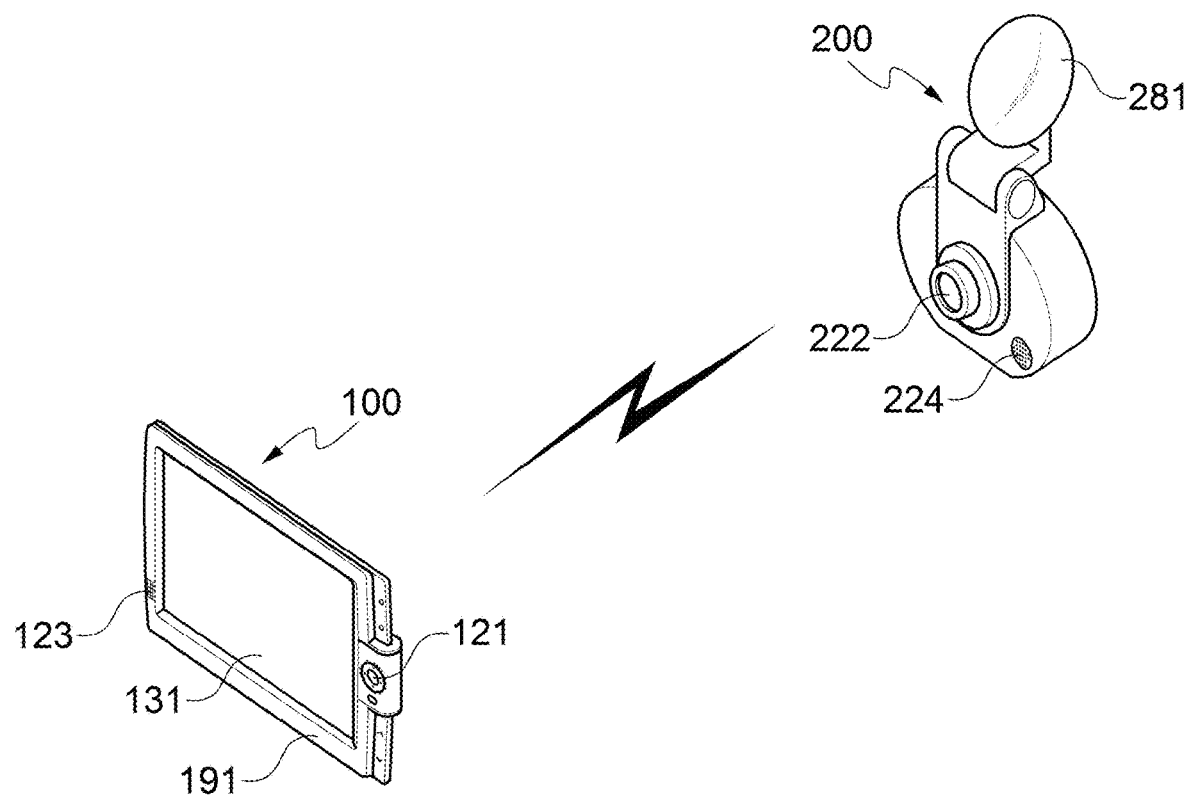
FIG. 14 is a diagram illustrating an implementation in the case where the electronic apparatus according to an embodiment of the present disclosure does not include an image capturing unit.

FIG. 14 is a diagram illustrating an implementation in the case where the electronic apparatus according to an embodiment of the present disclosure does not include an image capturing unit. Referring to FIG. 14, an image capturing device 200 for a vehicle that is provided separately from the electronic apparatus 100 may configure a system according to an embodiment of the present disclosure by using a wired/wireless communication manner.

The electronic apparatus 100 may include a display unit 131 provided on a front surface of a housing 191, a user input unit 121, and a microphone 123.

The image capturing device 200 for a vehicle may include a camera 222, a microphone 224, and an attaching part 281.

Figure 15:
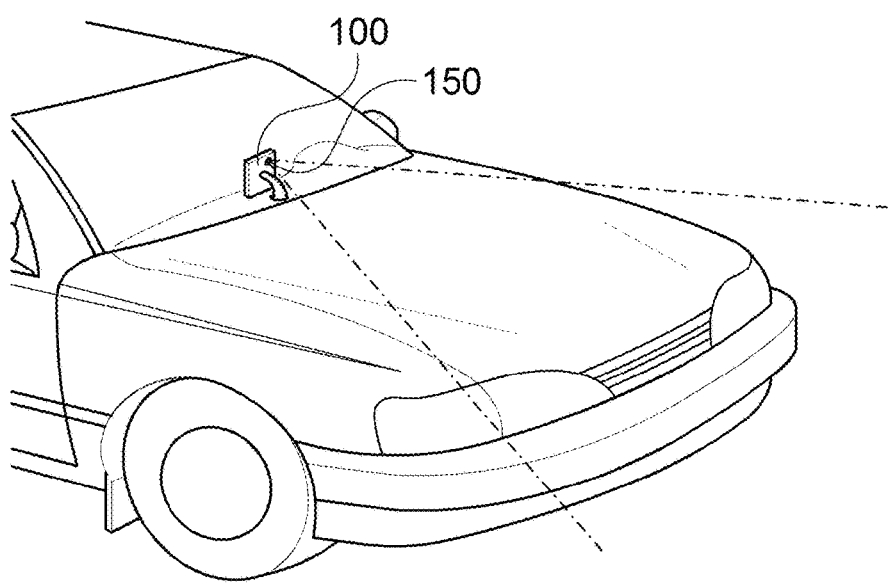
FIG. 15 is a view illustrating an implementation in the case where the electronic apparatus according to an embodiment of the present disclosure includes the image capturing unit.

FIG. 15 is a view illustrating an implementation in the case where the electronic apparatus according to an embodiment of the present disclosure includes the image capturing unit. Referring to FIG. 15, in the case where the electronic apparatus 100 includes the image capturing unit 150, the image capturing unit 150 of the electronic apparatus 100 may capture an image of an area in front of the vehicle and a display of the electronic apparatus 100 may be recognized by the user. Therefore, the system according to an embodiment of the present disclosure may be implemented.

Figure 16:
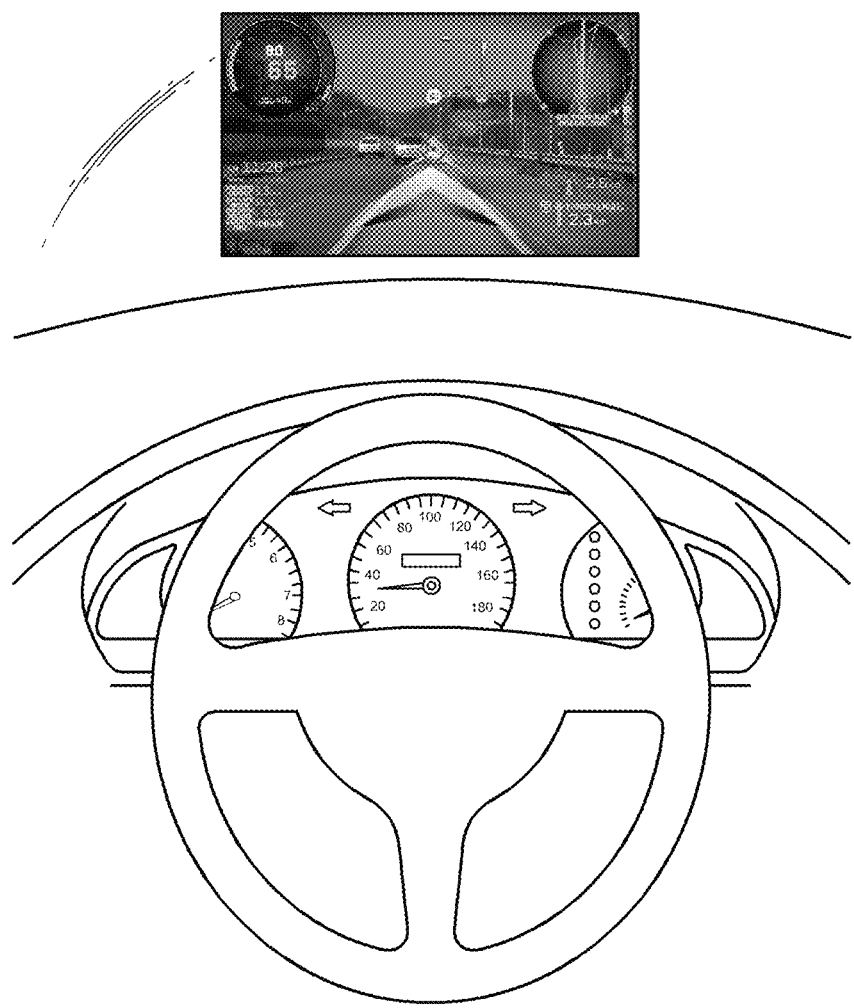
FIG. 16 is a view illustrating an implementation using a head-up display (HUD) according to an embodiment of the present disclosure.

FIG. 16 is a view illustrating an implementation using a head-up display (HUD) according to an embodiment of the present disclosure. Referring to FIG. 16, the HUD may display an augmented reality guidance screen thereon through wired/wireless communication with other devices.

As an example, the augmented reality may be provided through the HUD using a front glass of the vehicle, an image overlay using a separate image output device, or the like, and the augmented reality providing unit 160 may generate an interface image overlaid on the augmented reality image or the glass as described above, or the like. Through this, an augmented reality navigation device, a vehicle infortainment system, or the like, may be implemented.

Figure 17:
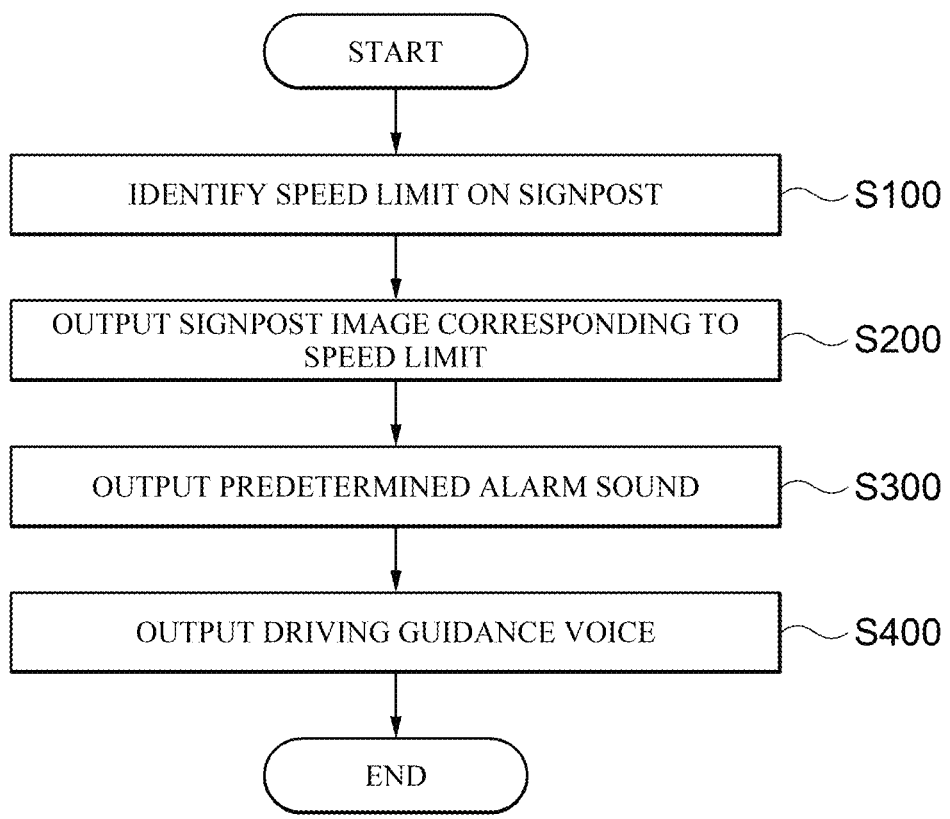
FIG. 17 is a flowchart illustrating a road speed limit notification method of the electronic apparatus according to an embodiment of the present disclosure.

FIG. 17 is a flowchart illustrating a road speed limit notification method of the electronic apparatus according to an embodiment of the present disclosure. Referring to FIG. 17, a speed limit of a speed limit sign may be first identified (S100).

In the identifying of the speed limit on the signpost (S100), the speed limit of the speed limit sign may be identified by selectively performing S10 to S50 in FIG. 9 or S41 to S60 in FIG. 10 described above.

Further, the control unit 170 may control the display unit 131 to output a signpost image corresponding to the identified speed limit on a screen of the display unit 131 (S200). Here, in the case where a current speed of the moving object exceeds the identified speed limit, the control unit 170 may control the display unit 131 to repeatedly output the output signpost image at predetermined intervals. Here, the predetermined intervals may be determined depending on a difference between the current speed and the speed limit.

Further, the control unit 170 may control the audio output unit 133 to output a predetermined alarm sound (S300). Here, in the case where the current speed of the moving object exceeds the speed limit, and a speed camera is present in front of the moving object within a predetermined distance, the control unit 170 may control the audio output unit 133 to output the predetermined alarm sound. Here, the control unit 170 may control the alarm sound depending on a difference between the current speed and the speed limit, or the predetermined distance in front of the vehicle.

Further, the control unit 170 may control the audio output unit 133 to output a driving guidance voice (S400). Here, the control unit 170 may control the audio output unit 133 to output the driving guidance voice when being driven on or entering a road section on which the variable speed limit system is installed. Specifically, in the case where the speed limit is changed on the basis of a weather condition when the moving object is driven on the road section on which the variable speed limit system is installed, the control unit 170 may control the audio output unit 133 to output the driving guidance voice.

The outputting of the signpost image (S200), the outputting of the alarm sound (S300), and the outputting of the driving guidance voice (S400) described above, which are performed by the electronic apparatus 100, may be performed separately or simultaneously. Further, the respective steps may be omitted or may be preferentially performed as needed.

Figure 18:
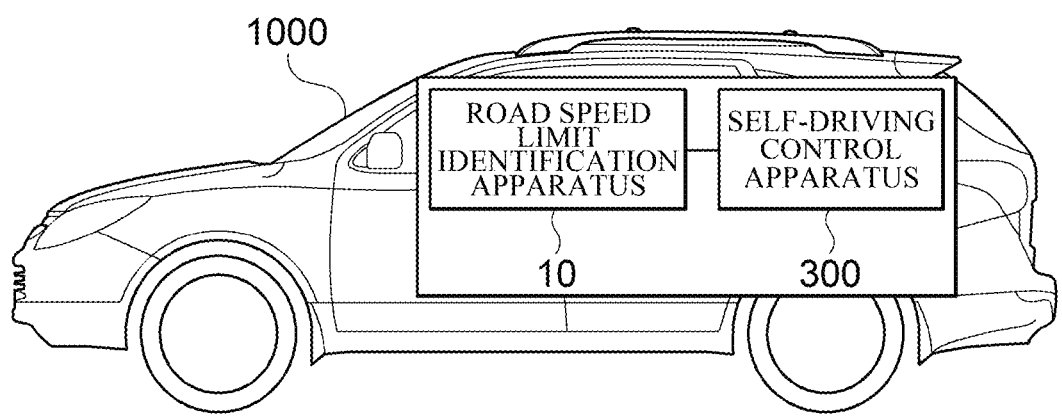
FIG. 18 is a block diagram illustrating a self-driving system according to an embodiment of the present disclosure.

FIG. 18 is a block diagram illustrating a self-driving system according to an embodiment of the present disclosure. Referring to FIG. 18, a self-driving system provided in a vehicle 1000 may include the road speed limit identification apparatus 10 and the self-driving control apparatus 300.

Here, the road speed limit identification apparatus 10 may identify a speed limit on a road on which the vehicle 1000 is being driven, and may transmit the identified speed limit value to the self-driving control apparatus 300.

In this case, the self-driving control apparatus 300 may control self-driving of the vehicle 1000 on the basis of speed limit information obtained from the road speed limit identification apparatus 10. Specifically, in the case where a driving speed of the vehicle exceeds the obtained speed limit, the self-driving control apparatus 300 may perform a control to decrease the speed of the vehicle 1000 from the current speed to a predetermined speed, or may transmit a command for controlling various units (a brake, a steering wheel, an engine, a motor, and the like) provided in the vehicle 1000 to stop the vehicle 1000. Further, in the case where a driving speed of the vehicle does not exceed the obtained speed limit, the self-driving control apparatus 300 may maintain the current speed or transmit a command for controlling various units (an accelerator, a steering wheel, an engine, a motor, and the like) associated with self-driving to increase the driving speed to a speed within the speed limit. That is, the self-driving control apparatus 300 may control the self-driving of the vehicle 1000 on the basis of the speed limit value obtained from the road speed limit identification apparatus 10.

Meanwhile, according to another embodiment, the road speed limit identification method according to the present disclosure may be implemented by modules in a control apparatus 2100 of a self-driving vehicle 2000. That is, a memory 2122 and a processor 2124 of the control apparatus 2100 may implement the road speed limit identification method according to the present disclosure in a form of software.

Hereinafter, this will be described in more detail with reference to FIG. 19.

Figure 19:
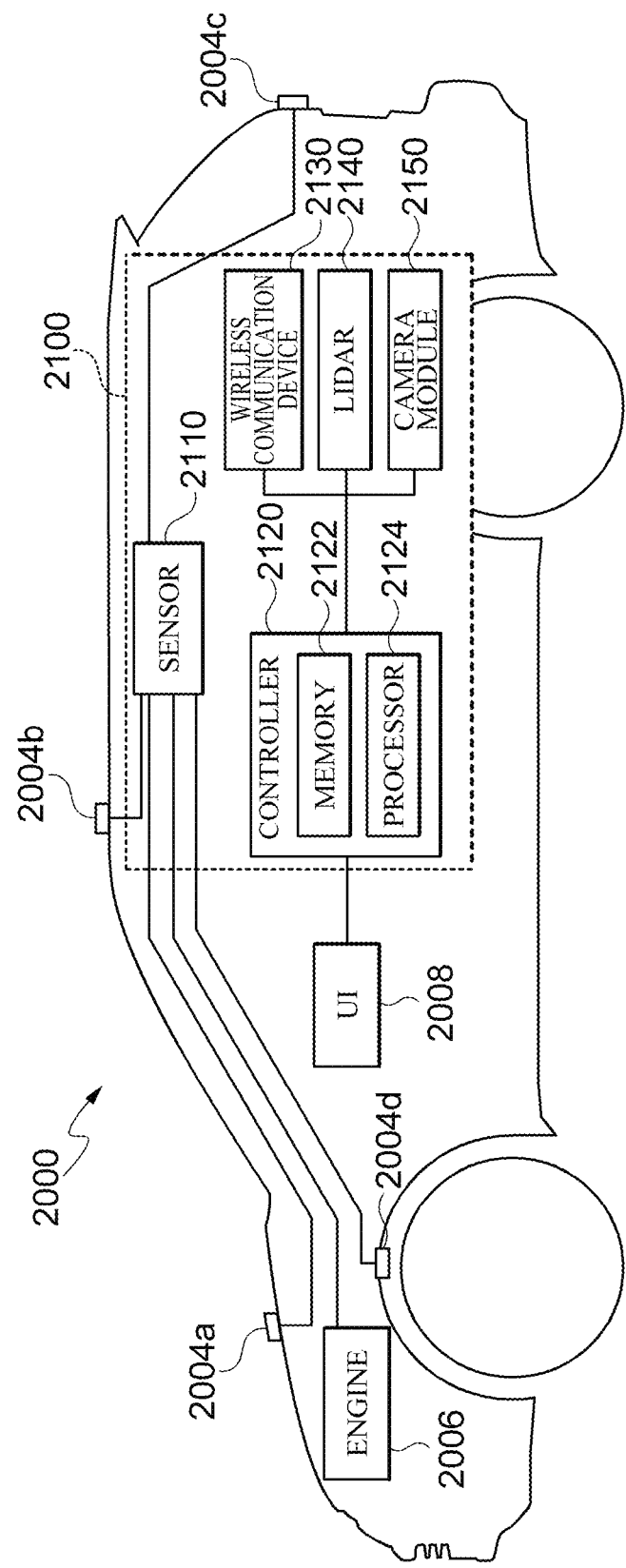
FIG. 19 is a block diagram illustrating a configuration of a self-driving vehicle according to an embodiment of the present disclosure.

FIG. 19 is a block diagram illustrating a configuration of the self-driving vehicle 2000 according to an embodiment of the present disclosure.

Referring to FIG. 19, the self-driving vehicle 2000 according to the present embodiment may include the control apparatus 2100, sensing modules 2004a to 2004d, an engine 2006, and a user interface 2008.

According to the present embodiment, the control apparatus 2100 may include a controller 2120 including the memory 2122 and the processor 2124, a sensor 2110, a wireless communication device 2130, a LIDAR device 2140, and a camera module 2150.

According to the present embodiment, the controller 2120 may be provided when the vehicle is manufactured by a manufacturer of the vehicle, or may be additionally provided for performing a self-driving function after the vehicle is manufactured. Alternatively, a component for continuously performing an additional function through an upgrade of the controller 2120 provided at the time of manufacturing the vehicle may be included.

The controller 2120 may transfer a control signal to the sensor 2110, the engine 2006, the user interface 2008, the wireless communication device 2130, the LIDAR device 2140, and the camera module 2150, which are other components in the vehicle. Further, although not illustrated, the controller 2120 may transfer a control signal to an accelerating device, a braking system, a steering device, or a navigation device, which is related to driving of the vehicle, as well.

According to the present embodiment, the controller 2120 may control the engine 2006. For example, the controller 2120 may detect a speed limit on a road on which the self-driving vehicle 2000 is being driven and control the engine 2006 to prevent a driving speed from exceeding the speed limit, or control the engine 2006 to increase the driving speed of the self-driving vehicle 2000 within a range not exceeding the speed limit. Additionally, when the sensing modules 2004a to 2004d detect an environment outside the vehicle and transfer a detection result to the sensor 2110, the controller 2120 may receive the detection result and generate a signal to control the engine 2006 or the steering device (not illustrated), thereby controlling the driving of the vehicle.

In the case where another vehicle or an obstacle is present in front of the vehicle, the controller 2120 may control the engine 2006 or the braking system to decrease the driving speed of the vehicle, and may control a trajectory, a driving route, and a steering angle, in addition to the driving speed. Alternatively, the controller 2120 may control the driving of the vehicle by generating a necessary control signal depending on other external environment recognition information such as a driving lane or a driving signal of the vehicle.

The controller 2120 may control the driving of the vehicle also by performing communication with a surrounding vehicle or a central server and transmitting a command for controlling ambient devices according to received information, in addition to generating the control signal by itself.

According to the present embodiments, the controller 2120 may include the memory 2122 and the processor 2124. The processor 2124 may execute software stored in the memory 2122 according to the control signal of the controller 2120. Specifically, the controller 2120 may store data and commands for performing the road speed limit identification method according to the present disclosure in the memory 2122, and the commands may be executed by the processor 2124 to implement one or more method disclosed herein.

Here, the memory 2122 may be stored in a non-volatile recording medium which may be executed by the processor 2124. The memory 2122 may store software and data through appropriate internal and external devices. The memory 2122 may be implemented by a random access memory (RAM), a read only memory (ROM), a hard disk, or a dongle-connected memory 2122.

The memory 2122 may at least store an operating system (OS), a user application, and executable commands. The memory 2122 may also store application data and array data structures.

The processor 2124 may be a micro-processor or an appropriate electronic processor such as a controller, a micro controller, or a state machine.

The processor 2124 may be implemented by a combination of computing devices, and the computing device may be implemented by a digital signal processor, a micro-processor, or an appropriate combination thereof.

Further, according to the present embodiment, the control apparatus 2100 may use at least one sensor 2110 to monitor internal and external characteristics of the self-driving vehicle 2000 and detect a state.

The sensor 2110 may be implemented by one or more sensing modules 2004, and each of the sensing modules 2004 may be implemented at a specific position in the self-driving vehicle 2000 according to a detection purpose. Each of the sensing modules 2004 may be positioned at a lower portion, a read end, a front end, an upper end, or a side end of the self-driving vehicle 2000 or may be positioned in an internal component of the vehicle, a tire, or the like.

Therefore, the sensing modules 2004 may detect information related to driving, such as the engine 2006, a tire, a steering angle, a speed, and a weight of the vehicle, as internal information of the vehicle. Further, each of the one or more sensing modules 2004 may be implemented by an acceleration sensor 2110, a gyroscope, an image sensor 2110, a RADAR sensor, an ultrasonic sensor, a LiDAR sensor, or the like, and may detect motion information of the self-driving vehicle 2000.

The sensing module 2004 may receive specific data related to state information of a road on which the self-driving vehicle 2000 is located, surrounding vehicle information, and an external environment state such as weather, as external information, and detect parameters of the vehicle according to the external information. The detected information may be stored in the memory 2122 temporarily or for a long term depending on purposes.

According to the present embodiment, the sensor 2110 may consolidate and collect information of the sensing modules 2004 for collecting internal and external information of the self-driving vehicle 2000.

The control apparatus 2100 may further include the wireless communication device 2130.

The wireless communication device 2130 is configured to implement wireless communication of the self-driving vehicle 2000. For example, the wireless communication device 2130 allows the self-driving vehicle 2000 to perform communication with a mobile phone of a user, another wireless communication device 2130, another vehicle, a central apparatus (traffic control apparatus), a service, or the like. The wireless communication device 2130 may transmit and receive a wireless signal according to a wireless access protocol. The wireless communication protocol may be, but is not limited to, Wi-Fi, Bluetooth, LTE, code division multiple access (CDMA), wideband code division multiple access (WCDMA), or global systems for mobile communications (GSM).

Further, according to the present embodiment, the self-driving vehicle 2000 may also implement vehicle-to-vehicle communication through the wireless communication device 2130. That is, the wireless communication device 2130 may perform communication with another vehicle and other vehicles on the road through vehicle-to-vehicle (V2V) communication. The self-driving vehicle 2000 may transmit and receive information such as a driving alarm and traffic information through the V2V communication, and may request another vehicle for information or may receive a request from another vehicle. For example, the wireless communication device 2130 may perform V2V communication by using a dedicated short-range communication (DSRC) device or a cellular-V2V (C-V2V) device. Further, in addition to the V2V communication, communication (vehicle to everything communication (V2X)) between a vehicle and another object (for example, an electronic apparatus that a pedestrian carries) may be implemented through the wireless communication device 2130.

Further, the control apparatus 2100 may include the LIDAR device 2140. The LIDAR device 2140 may detect an object around the self-driving vehicle 2000 during operation by using data sensed by a LIDAR sensor. The LIDAR device 2140 may transmit detected information to the controller 2120 and the controller 2120 may operate the self-driving vehicle 2000 according to the detected information. For example, the controller 2120 may command the engine 2006 to decrease a speed of the vehicle in the case where a vehicle that is being driven at a low speed is present in front of the vehicle according to the detected information. Alternatively, the controller 2120 may command the engine 2006 to decrease an entering speed according to a curvature of a curved road that the vehicle is to enter.

The control apparatus 2100 may further include the camera module 2150. The controller 2120 may extract object information from an outside image captured by the camera module 2150 and process the information.

Further, the control apparatus 2100 may further include imaging devices for recognizing an external environment. In addition to the LIDAR device 2140, a RADAR sensor, a GPS device, an odometer, and other computer vision devices may be used, and these devices may be operated selectively or simultaneously as needed to enable more precise detection.

The self-driving vehicle 2000 may further include the user interface 2008 for a user input with respect to the above-described control apparatus 2100. The user interface 2008 may allow the user to input information with appropriate interaction. For example, the user interface 2008 may be implemented by a touch screen, a keypad, an operation button, or the like. The user interface 2008 may transmit an input or command to the controller 2120, and the controller 2120 may perform a vehicle control operation in response to the input or command.

Further, the user interface 2008 may enable communication between the self-driving vehicle 2000 and a device outside the self-driving vehicle 2000 through the wireless communication device 2130. For example, the user interface 2008 may enable interworking with a mobile phone, a tablet PC, or another computer device.

Further, although the case where the self-driving vehicle 2000 according to the present embodiment includes the engine 2006 has been described, the self-driving vehicle 2000 may also include another type of propulsion system. For example, the vehicle may be operated by using electric energy, hydrogen energy, or a hybrid system using a combination thereof. Therefore, the controller 2120 may include a propulsion mechanism according to a propulsion system of the self-driving vehicle 2000, and may provide a control signal according thereto to components of each propulsion mechanism.

Figure 20:
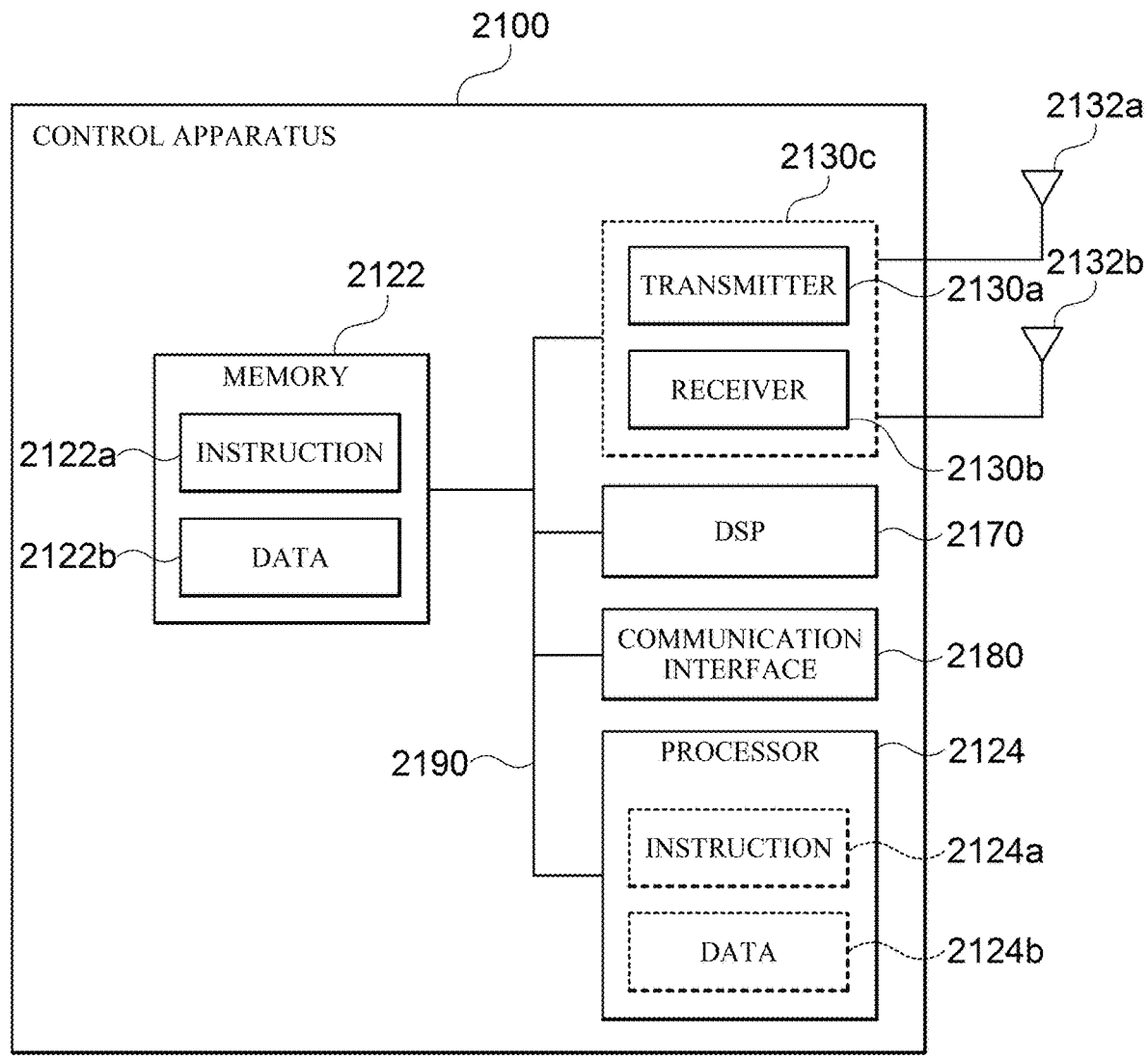
FIG. 20 is a block diagram illustrating a specific configuration of a control apparatus according to an embodiment of the present disclosure.

Hereinafter, a specific configuration of the control apparatus 2100 according to the present embodiment that performs the road speed limit identification method according to the present disclosure will be described in more detail with reference to FIG. 20.

The control apparatus 2100 includes the processor 2124. The processor 2124 may be a general-purpose single-chip or multi-chip micro-processor, a dedicated micro-processor, a microcontroller, a programmable gate array, or the like. The processor may also be referred to as a CPU. According to the present embodiment, a combination of a plurality of processors may also be used as the processor 2124.

The control apparatus 2100 also includes the memory 2122. The memory 2122 may be an electronic component capable of storing electronic information. The memory 2122 may also include a combination of memories 2122, in addition to a single memory.

Data 2122*b* and instructions 2122*a* for performing the road speed limit identification method according to the present disclosure may be stored in the memory 2122. When the processor 2124 executes the instructions 2122*a*, all or some of the instructions 2122*a* and data 2122*b* required for executing the command may be loaded (2124*a* and 2124*b*) onto the processor 2124.

The control apparatus 2100 may include a transmitter 2130*a*, a receiver 2130*b*, or a transceiver 2130*c* for allowing transmission and reception of signals. One or more antennas 2132*a* and 2132*b* may be electrically connected to the transmitter 2130*a*, the receiver 2130*b*, or each transceiver 2130*c*, and may additionally include antennas.

The control apparatus 2100 may include a digital signal processor (DSP) 2170. The vehicle may rapidly process a digital signal through the DSP 2170.

The control apparatus 2100 may include a communication interface 2180. The communication interface 2180 may include one or more ports and/or communication modules for connection between the control apparatus 2100 and other devices. The communication interface 2180 may enable interaction between the user and the control apparatus 2100.

Various components of the control apparatus 2100 may be connected to one another by using one or more buses 2190 and the buses 2190 may include a power bus, a control signal bus, a state signal bus, a data bus, and the like. The components may transfer information to one another through the buses 2190 and each perform a desired function according to a control of the processor 2124.

Meanwhile, in the above-described embodiments, the case where the target of interest is a speed limit sign has been described by way of example for convenience of explanation. However, the present disclosure is not limited thereto. The target of interest according to the present disclosure may include various road signs installed on a road and providing information to a driver, such as a width limit sign, a weight limit sign, a height limit sign, a following distance limit sign, and a minimum speed limit sign. In this case, the road speed limit identification method according to an embodiment of the present disclosure may be applied to each road sign described above in the same manner to identify and provide notification of a weight limit value, a height limit value, a following distance limit value, a minimum speed limit value, and the like.

In the specification and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that embodiments of the present disclosure set forth herein may be operated in a sequence different from a sequence illustrated or described herein. Likewise, in the case where it is described herein that a method includes a series of steps, a sequence of these steps suggested herein is not necessarily a sequence in which these steps may be executed. That is, any described step may be omitted and/or any other step that is not described herein may be added to the method.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that embodiments of the present disclosure set forth herein may be operated in a direction different from a direction illustrated or described herein. A term "connected" used herein is defined as being directly or indirectly connected in an electrical or non-electrical scheme. Here, targets described as being "adjacent to" each other may physically contact each other, be close to each other, or be in the same general range or region, in a context in which the above phrase is used. Here, a phrase "in an embodiment" means the same embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present specification are used only in order to easily make the specification. Therefore, these terms do not have meanings or roles that distinguish from each other in themselves.

In addition, terms used in the present specification are for explaining embodiments rather than limiting the present disclosure. In the present specification, a singular form includes a plural form unless explicitly described to the contrary. Components, steps, operations, and/or elements mentioned by terms "comprise" and/or "comprising" used in the specification do not exclude the existence or addition of one or more other components, steps, operations, and/or elements.

Hereinabove, the present disclosure has been described with reference to embodiments. All embodiments and conditional illustrations disclosed in the present specification have been described to intend to assist in the understanding of the principle and the concept of the present disclosure by those skilled in the art to which the present disclosure pertains. Therefore, it will be understood by those skilled in the art to which the present disclosure pertains that the present disclosure may be implemented in modified forms without departing from the spirit and scope of the present disclosure.

Therefore, embodiments disclosed herein should be considered in an illustrative aspect rather than a restrictive aspect. The scope of the present disclosure should be defined by the claims rather than the above-mentioned description, and equivalents to the claims should be interpreted to fall within the present disclosure.

Meanwhile, the road speed limit identification methods according to various embodiments of the present disclosure described above may be implemented as programs and be provided to servers or devices. Therefore, the respective apparatuses may access the servers or the devices in which the programs are stored to download the programs.

In addition, the control method according to various embodiments of the present disclosure described above may be implemented as programs and be provided in a state in which it is stored in various non-transitory computer readable media. The non-transitory computer readable medium is not a medium that stores data therein for a while, such as a register, a cache, or a memory, but means a medium that semi-permanently stores data therein and is readable by a device. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to the present disclosure, it is possible to lead safe driving by a driver by identifying a road speed limit in real time on the basis of a speed limit sign included in a driving image captured in real time during driving of a moving object and by providing notification of the identified road speed limit.

Further, it is possible to prevent the driver from being confused by accurately identifying a content of a speed limit sign changed in accordance with a change of a speed limit policy and by providing notification of the changed content of the speed limit sign.

Further, in the case where a wrong speed limit is stored in an existing map database, it is possible to automatically update the database by performing verification of a speed limit multiple times, the speed limit being calculated on the basis of a driving image of a moving object.

Further, it is possible to prevent the driver from being confused by identifying a content of the variable speed limit sign (variable speed limit system (VSLS)) through image analysis and providing notification of the content.

Although the embodiments of the present disclosure have been illustrated and described hereinabove, the present disclosure is not limited to the specific embodiments described above, but may be variously modified by those skilled in the art to which the present disclosure pertains without departing from the scope and spirit of the present disclosure as claimed in the claims. These modifications should also be understood to fall within the technical spirit and scope of the present disclosure.

What is claimed is:

1. A road speed limit identification method using a processor, the road speed limit identification method comprising:

obtaining a driving image captured during driving of a moving object;

setting a region of interest in the obtained driving image and generating a grayscale-processed image on the basis of an image of the region of interest;

detecting a speed limit sign image from the grayscale-processed image, wherein the speed limit sign includes a normal safety sign and a luminous safety sign, the luminous safety sign being means for inducing light from an internal light emitting diode through an optical fiber to emit light;

calculating a first brightness value of a number region, a second brightness value of a border region, and a third brightness value of an in-border region other than the number region in the detected speed limit sign image; and identifying a speed limit displayed on a speed limit sign on the basis of the plurality of calculated brightness values, wherein the generating of the grayscale-processed image includes:

generating a grayscale image by performing first grayscale processing on the image of the region of interest; and generating an inverted grayscale image by performing second grayscale processing on the image of the region of interest, and the first grayscale processing and the second grayscale processing are performed alternately.

2. The road speed limit identification method of claim 1, further comprising performing equalization by applying contrast limited adaptive histogram equalization (CLAHE) on the generated grayscale-processed image.

3. The road speed limit identification method of claim 2, wherein in the detecting of the speed limit sign image, the speed limit sign is detected by using, for the equalized image, a cascade algorithm in which a plurality of classifying devices using multi-scale block local binary pattern (MB-LBP) features are connected in a cascade structure.

4. The road speed limit identification method of claim 1, further comprising:
detecting an in-sign region image to be used to classify the speed limit sign, from the speed limit sign image by using the plurality of calculated brightness values; and
classifying the detected in-sign region image according to a content of the speed limit sign.

5. The road speed limit identification method of claim 4, wherein the classifying includes:
primarily classifying the detected in-sign region image according to the content of the speed limit sign on the basis of a feature of a first local binary pattern (LBP) by using a support vector machine (SVM) classifier; and
secondarily classifying the detected in-sign region image on the basis of a feature of a modified second LBP.

6. The road speed limit identification method of claim 1, further comprising generating map update data for updating a speed limit of map data in the case where a speed limit allocated to the map data at a location of the moving object and the speed limit identified from the driving image do not coincide with each other.

7. A road speed limit identification apparatus comprising:
an image obtaining unit obtaining a driving image captured during driving of a moving object;
a grayscale processing unit setting a region of interest in the obtained driving image and generating a grayscale-processed image on the basis of an image of the region of interest;
a speed limit sign detection unit detecting a speed limit sign image from the grayscale-processed image, wherein the speed limit sign includes a normal safety sign and a luminous safety sign, the luminous safety sign being means for inducing light from an internal light emitting diode through an optical fiber to emit light;
a brightness calculation unit calculating a first brightness value of a number region, a second brightness value of a border region, and a third brightness value of an in-border region other than the number region in the detected speed limit sign image; and
a speed limit identification unit identifying a speed limit displayed on a speed limit sign on the basis of the plurality of calculated brightness values,
wherein the grayscale processing unit generates a grayscale image by performing first grayscale processing on the image of the region of interest and generates an inverted grayscale image by performing second grayscale processing on the image of the region of interest, and
the first grayscale processing and the second grayscale processing are performed alternately.

8. The road speed limit identification apparatus of claim 7, further comprising an equalization unit performing equalization by applying CLAHE on the generated grayscale-processed image.

9. The road speed limit identification apparatus of claim 8, wherein the speed limit sign detection unit detects the speed limit sign by using, for the equalized image, a cascade algorithm in which a plurality of classifying devices using MB-LBP features are connected in a cascade structure.

10. The road speed limit identification apparatus of claim 7, wherein the speed limit identification unit includes:
an in-sign region detection unit detecting an in-sign region image to be used to classify the speed limit sign, from the speed limit sign image by using the plurality of calculated brightness values; and
an in-sign region classification unit classifying the detected in-sign region image according to a content of the speed limit sign.

11. The road speed limit identification apparatus of claim 10, wherein the in-sign region classification unit primarily classifies the detected in-sign region image according to the content of the speed limit sign on the basis of a feature of a first LBP by using an SVM classifier, and secondarily classifies the detected in-sign region image on the basis of a feature of a modified second LBP.

12. The road speed limit identification apparatus of claim 7, further comprising a map update data generation unit generating map update data for updating a speed limit of map data in the case where a speed limit allocated to the map data at a location of the moving object and the speed limit identified from the driving image do not coincide with each other.

13. An electronic apparatus providing notification for assisting in driving by a driver, the electronic apparatus comprising:
an output unit outputting notification information that is checkable by the driver;
an image obtaining unit obtaining a driving image captured during driving of a moving object;
a grayscale processing unit setting a region of interest in the obtained driving image and generating a grayscale-processed image on the basis of an image of the region of interest;
a speed limit sign detection unit detecting a speed limit sign image from the grayscale-processed image, wherein the speed limit sign includes a normal safety sign and a luminous safety sign, the luminous safety sign being means for inducing light from an internal light emitting diode through an optical fiber to emit light;
a brightness calculation unit calculating a first brightness value of a number region, a second brightness value of a border region, and a third brightness value of an in-border region other than the number region in the detected speed limit sign image;
a speed limit identification unit identifying a speed limit displayed on a speed limit sign on the basis of the plurality of calculated brightness values; and
a control unit controlling the output unit to output speed limit notification for a road on which the moving object is being driven, on the basis of the identified speed limit,
wherein the grayscale processing unit generates a grayscale image by performing first grayscale processing on the image of the region of interest and generates an inverted grayscale image by performing second grayscale processing on the image of the region of interest, and
the first grayscale processing and the second grayscale processing are performed alternately.

14. The electronic apparatus of claim 13, wherein the output unit includes a display unit outputting an augmented reality image by combining the captured driving image and a notification object, and once the speed limit on the road on which the moving object is being driven is identified from the driving image, the control unit generates a speed limit notification object indicating a speed limit value corresponding to the identified speed limit, and controls the display unit to display the generated speed limit notification object on the augmented reality image.

15. The electronic apparatus of claim 14, wherein in the case where a driving speed of the moving object exceeds the speed limit, the control unit performs a control to change at least one of a color, a size, or a displayed position of the notification object.

16. The electronic apparatus of claim 14, wherein once a change of the speed limit on the road on which the moving object is being driven is detected during driving of the moving object on a road section on which a variable speed limit system is installed, the control unit controls the output unit to notify that the speed limit is changed.

* * * * *